United States Patent
Fujita et al.

(10) Patent No.: US 7,662,496 B2
(45) Date of Patent: Feb. 16, 2010

(54) FUEL CELL COOLING SYSTEM AND METHOD FOR CONTROLLING CIRCULATION OF COOLING LIQUID IN FUEL CELL

(75) Inventors: Nobuo Fujita, Toyota (JP); Toshiyuki Kondo, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 499 days.

(21) Appl. No.: 10/557,699

(22) PCT Filed: Jul. 29, 2004

(86) PCT No.: PCT/IB2004/002427

§ 371 (c)(1),
(2), (4) Date: Nov. 22, 2005

(87) PCT Pub. No.: WO2005/011037

PCT Pub. Date: Feb. 3, 2005

(65) Prior Publication Data

US 2006/0269807 A1 Nov. 30, 2006

(30) Foreign Application Priority Data

Jul. 30, 2003 (JP) .............................. 2003-282850

(51) Int. Cl.
*H01M 8/04* (2006.01)
*H01M 2/00* (2006.01)
*H01M 8/00* (2006.01)

(52) U.S. Cl. .............................. 429/26; 429/22; 429/24; 429/34; 429/9; 429/13

(58) Field of Classification Search ............. 429/13–30; 210/167.31, 182, 186, 348, 445, 663–664
See application file for complete search history.

(56) References Cited

U.S. PATENT DOCUMENTS 4,344,850 A * 8/1982 Grasso ........................ 210/664
5,972,213 A * 10/1999 Golan ........................ 210/186

(Continued)

FOREIGN PATENT DOCUMENTS

DE 31 52722 A1 5/1982

(Continued)

OTHER PUBLICATIONS

German Language Version of German Official Letter for Appln. No. 112004001059.4-45, issued Aug. 14, 2006.

(Continued)

*Primary Examiner*—Dah-Wei D Yuan
*Assistant Examiner*—Claire L Rademaker
(74) *Attorney, Agent, or Firm*—Kenyon & Kenyon LLP

(57) ABSTRACT

A cooling system for a fuel cell is provided with a cooling apparatus that regulates the temperature of the fuel cell by supplying the fuel cell with a cooling liquid via a cooling liquid passage by means of a water pump; an impurity-removing device which is provided in the cooling liquid passage and which removes impurities from within the cooling liquid; and flow generating means for causing the cooling liquid in the cooling liquid passage to flow through the impurity-removing device when the fuel cell is not operating.

15 Claims, 21 Drawing Sheets

U.S. PATENT DOCUMENTS

| | | | |
|---|---|---|---|
| 2001/0053470 A1* | 12/2001 | Misumi | 429/26 |
| 2002/0098393 A1* | 7/2002 | Dine et al. | 429/13 |
| 2002/0119357 A1* | 8/2002 | Baldauf et al. | 429/30 |
| 2002/0164511 A1* | 11/2002 | Uozumi | 429/24 |
| 2003/0203258 A1* | 10/2003 | Yang et al. | 429/25 |
| 2004/0005486 A1* | 1/2004 | Baker | 429/22 |

FOREIGN PATENT DOCUMENTS

| | | |
|---|---|---|
| DE | 297 18 733 U1 | 4/1997 |
| DE | 296 23 879 U1 | 4/2000 |
| JP | H02-010664 | 1/1990 |
| JP | A 06-084534 | 3/1994 |
| JP | 2000-208157 A | 7/2000 |
| JP | 2001-035519 A | 2/2001 |
| JP | 2001 093556 | 4/2001 |
| JP | 2001-313377 A | 11/2001 |
| JP | 2002 141095 A | 5/2002 |
| JP | 2002-216817 A | 8/2002 |
| JP | 2003-123804 A | 4/2003 |
| JP | 2003-123813 A | 4/2003 |
| WO | WO 01/47052 A1 | 6/2001 |
| WO | WO 02/063707 A2 | 8/2002 |
| WO | WO 2004/004041 A1 | 1/2004 |

OTHER PUBLICATIONS

English Translation of German Official Letter for Appln. No. 112004001059.4-45, issued Aug. 14, 2006.

Japanese Language Version of Japanese Office Action, Appln. No. 2003-282850 dated Aug. 22, 2007.

English Translation of Japanese Office Action, Appln. No. 2003-282850 dated Aug. 22, 2007.

* cited by examiner

FUEL CELL COOLING SYSTEM AND METHOD FOR CONTROLLING CIRCULATION OF COOLING LIQUID IN FUEL CELL

This is a 371 national phase application of PCT/IB2004/002427 filed 29 Jul. 2004, claiming priority to Japanese Patent Application No. 2003-282850 filed 30 Jul. 2003, the contents of which are incorporated herein by reference.

BACKGROUND OF THE INVENTION

1. Field of the Invention

The invention generally relates to a fuel cell system, and more particularly to the improvement of a cooling system for a fuel cell stack. Also, the invention relates to a method for controlling circulation of a cooling liquid in a fuel cell system.

2. Description of the Related Art

A fuel cell generates electricity through a chemical reaction. More specifically, a fuel cell is structured such that an electrolyte is sandwiched between an anode and a cathode. Hydrogen or a hydrogen-rich reformate gas is supplied to the anode while oxygen is supplied to the cathode. An electrochemical reaction is then induced which results in the generation of electrical energy. A plurality of these fuel cells are usually combined to form a fuel cell stack. These fuel cells are classified into different types, such as phosphoric-acid fuel cells, solid oxide fuel cells, and polymer electrolyte fuel cells, according to the type of electrolyte they use, for example. Each type of electrolyte has an operating temperature that is best for performing its function. For example, the operating temperature of the electrolyte of a polymer electrolyte fuel cell (PEFC) is typically around 80° C. In order to run a fuel cell system while maintaining the optimum operating temperature of the electrolyte, a cooling system is provided for the fuel cell system. Polymer electrolyte fuel cells use a liquid including deionized water, unfreezable water and the like, for the cooling liquid.

The cooling system of a fuel cell includes a cooling liquid, a heat exchanger (such as a radiator) that reduces the temperature of the cooling liquid using outside air, a pump that pumps the cooling liquid, an internal passage that runs through separators provided in a fuel cell stack and through which the cooling liquid flows, a cooling liquid passage for circulating the cooling liquid between the heat exchanger and the fuel cell stack, and an ion filter for removing ions, and the like. This ion filter is made of an ion exchange resin, for example, and removes electrically conductive ions of metal, for example, that have leached into the cooling liquid from the heat exchanger, the fuel cell stack, the cooling liquid passage pipe wall, and the pump. Removing these ions prevents a reduction in insulating resistance between the fuel cell and the vehicle body earth.

JP(A) 2000-208157 discloses an example of a fuel cell system provided with such an ion filter. The invention disclosed in this publication proposes a structure in which there are a main coolant passage and a sub-coolant passage which is independent of the main coolant passage. The main coolant passage is used for cooling the fuel cell. The sub-coolant passage is used to circulate the coolant within a coolant tank through an ion filter, which is provided in the sub-coolant passage, in order to remove ions from the coolant.

When the fuel cell system is operating, it circulates the cooling liquid using a pump. Some of the cooling liquid is passed through the ion filter which removes ions, thereby lowering the ion concentration. When the fuel cell system is not operating, however, the pump is stopped so the cooling liquid is not circulated through the ion filter.

As a result, ions of metal, for example, leach into the cooling liquid from the heat exchanger, the fuel cell stack (ion exchange membrane and separator), the cooling liquid passage, and the like when the fuel cell system is not operating. As the ion metals, for example, leach into the cooling liquid, the concentration of ions in the cooling liquid increases. When the fuel cell system is not operated for an extended period of time, in which case the ion concentration in the cooling liquid increases substantially, it is necessary to remove the ions in the cooling liquid in order to reduce the ion concentration in the cooling liquid before restarting the fuel cell. Thus time is required before the fuel cell system can be started. A fuel cell system in a vehicle, in particular, is unable to be started up immediately because of the time that it takes to remove the ions. This means that time is required before the vehicle can be driven.

SUMMARY OF THE INVENTION

In view of the foregoing problems, one object of this invention is to provide a cooling system for a fuel cell which is capable of suppressing an increase in impurities (ion concentration) in a cooling liquid of the fuel cell even after operation of the fuel cell system has stopped.

Another object of the invention is to provide a cooling system for a fuel cell system in a vehicle, which is capable of shortening the startup time of the vehicle by suppressing an increase in impurities (ion concentration) in a cooling liquid that occurs due to the fuel cell system not being operated for an extended period of time.

A further object of the invention is to provide a cooling system for a fuel cell system in a vehicle, which is capable of shortening the startup time of the vehicle by suppressing an increase in impurities (ion concentration) in a cooling liquid of the fuel cell by passing the cooling liquid through an impurity-removing device (e.g., an ion filter) and removing the impurities (e.g., ions) from the cooling liquid even after the fuel cell system has stopped operating.

In order to achieve one of the foregoing objects, a cooling system for a fuel cell according to the invention is provided with a cooling apparatus that regulates the temperature of the fuel cell by supplying a cooling liquid thereto with a pump; an impurity-removing device provided in a cooling liquid passage for the cooling liquid, which removes impurities from the cooling liquid, and flow generating means for causing the cooling liquid within the cooling liquid passage to flow through the impurity-removing device when the fuel cell is not operating. The phraseology, "when the fuel cell is not operating" is understood here to mean that there is no longer a demand for power from the fuel cell so the fuel cell system, including the fuel cell and auxiliary devices related to the operation of the fuel cell (such as a cooling apparatus, a hydrogen/air supply apparatus, a reformer, an inverter, etc.), stops operating. At the very least, it is understood to mean that the fuel cell and the cooling apparatus (i.e., a cooling liquid pump) stop operating.

This structure suppresses an increase in the impurities concentration in the cooling liquid (or coolant) by passing it through the impurity-removing device to remove the impurities even when the fuel cell system or a system of a vehicle equipped with the fuel cell is turned off. As a result, the number of impurities in the cooling liquid when the fuel cell starts to be operated is reduced, enabling the time that it takes for vehicle startup to be shortened. Examples of impurities include conductive ions that leach into the cooling liquid from a heat exchanger (a radiator in a vehicle or a stationary body), pipes, a fuel cell stack (i.e., ion-exchange membrane, separator), as well as other components that leach into the cooling liquid.

The cooling liquid can be made to flow through the impurity-removing device by temporarily (or intermittently) operating a pump (including a motor as the driving source), for example, when the fuel cell is not operating. The cooling liquid can also be made to flow by creating a temperature difference in the cooling liquid so as to generate convection. The cooling liquid may be, for example, deionized water or a combination of deionized water and an additive, or a liquid for cooling other than water. The impurity-removing device may be, for example, a device which uses an ion-exchange resin as a filter or a device combining an ion-exchange resin and a filter that remove fine particles.

The flow generating means preferably includes impurity detecting means for detecting the state (e.g., quantity) of impurities in the cooling liquid, and startup controlling means for starting up the fuel cell when a predetermined quantity or greater of the impurities is detected. In this case, operating the fuel cell when impurities are detected means activating the fuel cell for the purpose of removing the impurities at a time when there is no power demand on the fuel cell (i.e., when the fuel cell is not operating), for example. Therefore, the state of the cooling liquid is monitored even when the fuel cell is not operating so that the fuel cell can be started to remove impurities from the cooling liquid before the their level (i.e., the impurity concentration) exceeds an allowable level in view of, for example, the insulating resistance of the cooling liquid. The structure enables a pump to be activated even when no battery (i.e., secondary battery) is provided or the state-of-charge (SOC) of the battery is low.

The flow generating means preferably includes impurity detecting means for detecting the state (e.g., quantity) of impurities in the cooling liquid, and pump control means for operating the pump when a predetermined quantity or greater of the impurities is detected. Operating the pump in this case means starting the pump for the purpose of removing impurities at a time when there is no power demand on the fuel cell (i.e., when the fuel cell is not operating), for example. Therefore, the state of the cooling liquid is monitored even when the fuel cell is not operating. If the level of impurities exceeds the predetermined level, the pump is activated to circulate the cooling liquid through the impurity-removing device to remove the impurities while the fuel cell is still stopped. This structure enables impurities to be removed while conserving energy.

The flow generating means also preferably includes a battery for supplying power to the pump. The pump controlling means controls operating quantities (such as the pump operating time and pump delivery pressure) based on the SOC of the battery. As a result, the pump is operated to remove the impurities in the cooling liquid without activating the battery. Further, over-discharge of the battery is inhibited by regulating pump operation depending on the SOC of the battery.

The impurity detecting means preferably determines a change in the state (e.g., quantity) of the impurities in the cooling liquid based on the amount of time that elapses after the pump is stopped. The impurity concentration (i.e., the ion concentration or the conductivity of the cooling liquid) characteristic of the impurities (e.g., ions) that have leached into the cooling liquid with respect to the amount of time that has passed can be obtained beforehand through experimentation or simulation or the like, and stored in a nonvolatile memory of a system control unit, for example. The quantity of impurities (e.g., ions) in the cooling liquid can then be estimated based on the amount of time elapsed. The phraseology, "after the pump has stopped" can be understood here to mean after the cooling liquid can no longer flow into the impurity-removing device, for example, which is a state similar to that in which the pump is stopped.

The impurity detecting means preferably determines a change in the state (e.g., quantity) of impurities in the cooling liquid based on the amount of time that elapsed after the pump is stopped and the temperature of the cooling liquid. The phraseology, "after the pump has stopped" can be understood here to mean, for example, after the cooling liquid can no longer flow into the impurity-removing device. The impurity concentration (i.e., the ion concentration or the conductivity of the cooling liquid) characteristic has, as parameters, the amount of time that the impurities (e.g., ions) have been in the cooling liquid (i.e., the elapsed time) and the cooling liquid temperature. This impurity concentration characteristic can be obtained beforehand through experimentation or simulation or the like and stored in a nonvolatile memory of a system control unit, for example. The quantity of impurities (e.g., ions) in the cooling liquid can be estimated based on the amount of time elapsed and the temperature.

The flow generating means may include temperature difference generating means for generating a temperature difference between a portion of the cooling liquid in the cooling liquid passage and the cooling liquid elsewhere. This temperature difference creates convection within the cooling liquid passage, which causes the cooling liquid to flow through the impurity-removing device so that the impurities are removed without operating the pump, even when the fuel cell is not operating. Because the pump (or drive motor) is not operated, it is possible to reduce not only the amount of energy consumed by the system, but also the operating noise.

The temperature difference generating means may be heat transferring means for transferring heat energy from outside the cooling liquid passage to inside the cooling liquid passage. The heat transferring means corresponds to, for example, a heat exchange fin, heat pipe, or a radiator or the like, for reducing (or increasing) the temperature of part of the cooling liquid passage. The heat exchange fin is subject to outside air or heat from some other heat source and performs heat exchange with the cooling liquid. Heat generated from a hydrogen storing alloy, a heater, heated cooling liquid, or solar heat, or the like can also be used as the heat source.

Furthermore, the heat transferring means includes a heat exchanger (such as a radiator in a vehicle or stationary body) that transfers the heat energy from outside to inside the cooling liquid passage. The heat transferring means may also include a switching valve that establishes or disestablishes a path for the cooling liquid to the heat exchanger. This obviates the need to provide an additional device that is used only when the fuel cell system is stopped, and therefore simplifies the structure of the cooling system.

The temperature difference generating means may be an exothermic body or an endothermic body, such as a heater or a thermoelectric element. This enables a temperature difference to be actively generated in the cooling liquid in order to create convection.

The temperature difference generating means may be an accumulator that stores heat when the fuel cell is operating, and transfers that heat to the cooling liquid passage when the fuel cell is not operating. Accordingly, storing the heat generated while the fuel cell is operating and using that heat while the fuel cell is not operating obviates the need to provide a dedicated heat source.

The accumulator may be a cooling liquid storage device that stores the cooling liquid. The accumulator may also include a supply control device that supplies to the cooling liquid passage, in response to a temperature difference, the heated cooling liquid that was stored while the fuel cell was operating.

The impurity-removing device may also be provided with a heat exchanger (such as a radiator in a vehicle or a stationary body) as the cooling apparatus.

Further, the heat exchanger (e.g., radiator) in this invention may include an upper tank and a lower tank, a plurality of thin pipes, and an impurity-removing device (e.g., an ion filter). The upper tank and lower tank store cooling liquid. The thin pipes have heat exchange fins formed on them and connect the upper tank with the lower tank so as to transfer cooling liquid therebetween. The impurity-removing device is incorporated into a portion of the plurality of thin pipes, and removes impurities from the cooling liquid.

As a result, it is possible to incorporate a structure for removing impurities (e.g., ions) into the heat exchanger (e.g., radiator), and therefore possible to remove the impurities (e.g., ions) at an location close to where they leached into the cooling liquid. Further, it is possible to minimize structural additions to the cooling system of the fuel cell for the purpose of removing the impurities (e.g., ions).

The impurity-removing device may include an ion exchange resin for removing ions within the cooling liquid, and a particle filter for removing particles within the cooling liquid.

Further, a temperature difference is preferably created between the thin pipes built into the impurity-removing device and other thin pipes. As a result, convection is generated within the heat exchanger (e.g., radiator) which causes the cooling liquid to circulate through the impurity-removing device.

According to this invention, another cooling system of a fuel cell which regulates the temperature of the fuel cell by supplying cooling liquid thereto with a pump, includes impurity quantity estimating means for estimating the quantity of impurities in the cooling liquid based on the amount of time that passes after the pump is stopped. Accordingly, a warning display may be produced when the fuel cell is started or stopped based on this estimated impurity quantity, and the impurity-removing device started in order to remove the impurities in the cooling liquid. Also, according to this invention, another cooling system of the fuel cell includes a cooling apparatus that regulates the temperature of the fuel cell by supplying cooling liquid thereto with a pump, and an impurity-removing device provided in a cooling liquid passage for the cooling liquid and which removes impurities within the cooling liquid. This cooling system further includes impurity quantity estimating means for estimating a quantity of impurities in the cooling liquid based on the amount of time that passes after the pump is stopped. This structure makes it possible to suppress an increase in the concentration of impurities in the cooling liquid, even when the fuel cell is not operating or when a system of a vehicle equipped with the fuel cell is turned off, by predicting an increase in the impurity concentration in the cooling liquid and operating the pump for a predetermined period of time based on that prediction. Also according to the invention, a cooling system of the fuel cell includes a cooling apparatus that regulates the temperature of the fuel cell by supplying cooling liquid thereto with a pump, an impurity-removing device which is provided in a cooling liquid passage for the cooling liquid, and flow generating means for causing the cooling liquid within the cooling liquid passage to flow through the impurity-removing device while the pump of the fuel cell is stopped. The flow generating means in this cooling system includes impurity quantity estimating means for estimating a quantity of impurities in the cooling liquid based on the amount of time that passes after the pump is stopped, and pump controlling means for operating the pump when the estimated impurity quantity exceeds a predetermined value.

This structure makes it possible to suppress an increase in the concentration of impurities in the cooling liquid even when the fuel cell is not operating or when a system of a vehicle equipped with the fuel cell is turned off, by predicting an increase in the concentration of impurities in the cooling liquid and operating the pump for a predetermined period of time based on that prediction.

The impurity quantity estimating means preferably maintains an impurity concentration increase characteristic of the cooling liquid over a period of time, and estimates, from that characteristic, the impurity concentration (or impurity quantity, conductivity) corresponding to the time elapsed since the system was turned off. As a result, even if a measuring device (e.g., a detector) for directly detecting the impurity concentration is not used, the impurities in the cooling liquid can still be removed after the predetermined period of time passes after the system was turned off.

The impurity quantity estimating means preferably maintains a plurality of impurity concentration increase characteristics of the cooling liquid over a period of time using the cooling liquid temperature as a parameter, and estimates, from those characteristics, the impurity concentration (or impurity quantity, conductivity) corresponding to the time elapsed after the system was turned off and the temperature of the cooling liquid. As a result, even if a measuring device (e.g., a detector) for directly detecting the impurity concentration is not used, the impurities within the cooling liquid can still be removed after the predetermined period of time has passed after the system was turned off.

This invention enables impurities within the cooling liquid of the fuel cell to be removed even after the fuel cell is not operating or when a system of a vehicle equipped with the fuel cell has been turned off, by passing the cooling liquid through the impurity-removing device.

DETAILED DESCRIPTION OF THE PREFERRED EMBODIMENTS

In the following description and the accompanying drawings, the present invention will be described in more detail in terms of exemplary embodiments. In the exemplary embodiments of this invention, an increase in the concentration of impurities such as ions and particles that have leached into the cooling liquid is suppressed even when a fuel cell is not generating electricity, by passing the cooling liquid through an ion filter which serves as an impurity-removing device. The cooling liquid may be made to flow through the impurity-removing device by being circulated by, for example, a water pump (drive pump) of the fuel cell that is intermittently operated, as in the first through the fifth exemplary embodiments. In this case, the pump can be intermittently operated in response to the state (e.g., quantity) of the impurities in the cooling liquid, e.g., in response to the conductivity or impurity concentration. Alternatively, the cooling liquid of the fuel cell may be made to flow through the impurity-removing device by convection generated by a temperature difference in the cooling liquid, as in the sixth through the fourteenth exemplary embodiments. A plurality of these exemplary embodiments may also be appropriately combined.

A first exemplary embodiment will now be described with reference to FIGS. 1 to 3. This exemplary embodiment enables ions in the cooling liquid to be removed while conserving as much energy as possible by operating a water pump 16 intermittently, that is, only when an impurity ion concentration (conductivity) within the cooling liquid increases when the fuel cell is not operating or when a system of a vehicle equipped with the fuel cell is turned off.

Figure 1:
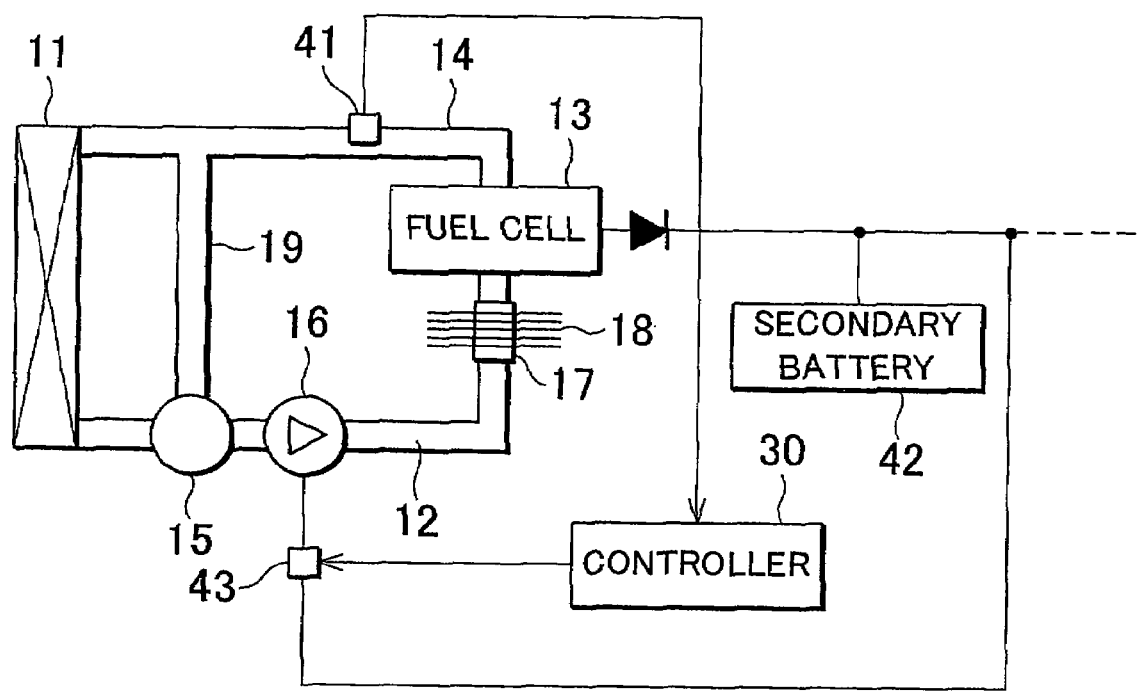
FIG. 1 is a view showing a first exemplary embodiment of the invention.
Figure 2:
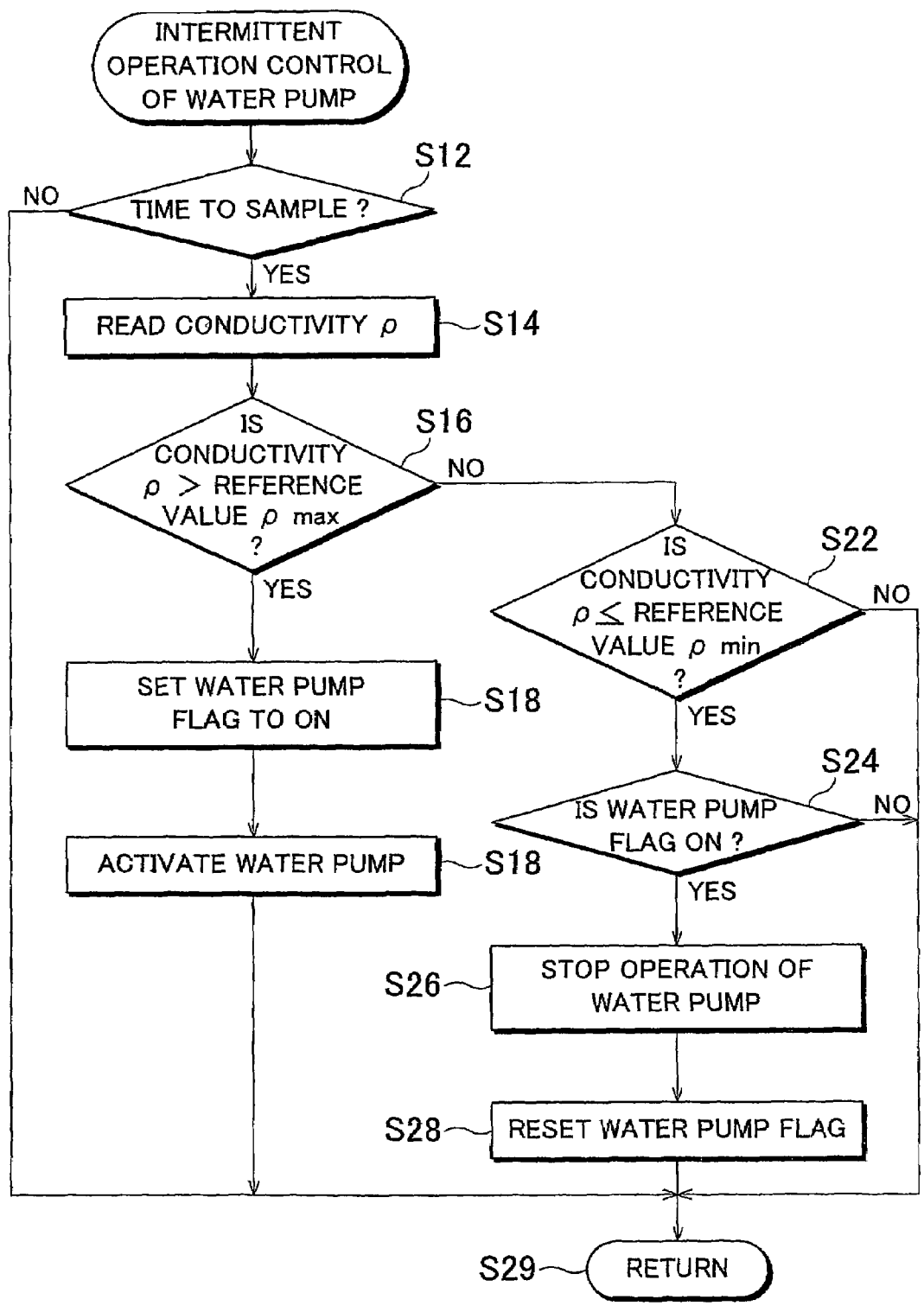
FIG. 2 is a flowchart illustrating the control operation of a controller according to the first exemplary embodiment.

FIG. 1 schematically shows a cooling system of a fuel cell system that operates a water pump intermittently. FIG. 2 is a flowchart illustrating control of a controller 30 in the cooling system of the fuel cell system. FIG. 3 is a graph showing an example of a change in the impurity ion concentration (conductivity) in a cooling liquid passage and an operational example of the water pump 16 that is controlled in response to the impurity ion concentration.

In the structure of the cooling system of the fuel cell system shown in FIG. 1, a radiator 11 serves as a heat exchanger that cools a cooling liquid 12 using outside air. This cooling liquid 12 is mainly deionized water and unfreezable water. The cooling liquid 12 is circulated between the radiator 11 and a fuel cell 13 via a cooling liquid passage 14. A bypass passage 19 through which the cooling liquid 12 may also be circulated is provided which bypasses the radiator 11. A rotary valve 15 switches the path of the cooling liquid 12, channeling it either to the radiator 11 or to the bypass passage 19. A water pump 16 circulates the cooling liquid 12, while an ion filter 17 removes impurities from the cooling liquid 12. It is desirable that the ion filer 17 be provided near the portion where the cooling liquid enters the fuel cell 13 so that cooling liquid 12 from which the impurity ions have been removed is supplied to the fuel cell 13. Heat exchange fins 18 (or a heat pipe with built-in fins), which act as heat transfer means for transferring heat between the ion filter 17 and the outside air, can be provided on the ion filter 17 (see FIGS. 19 and 20). These heat exchange fins 18 will be described in detail later. Electric energy generated by the fuel cell 13 is supplied to, for example, a secondary battery 42 or an inverter which drives a vehicle motor, not shown, via a one-way element that allows the power to flow one direction and prevents it from flowing in the other.

A conductivity detection meter 41 is provided midway in the cooling liquid passage 14 to detect the impurity ion concentration (conductivity) in the cooling liquid 12. The output from the conductivity detection meter 41 is sent to the controller (or control unit) 30. This controller 30 controls the operation of a drive circuit 43 that carries power from the secondary battery 42 to the water pump 16. The controller 30 also controls the path-switching operation of the rotary valve 15. The controller 30 may be, for example, a computer system that is provided separately as a cooling control system of the fuel cell 13, or the functions of the controller 30 may simply be realized by functions of a control computer of the fuel cell system.

The control operation of the controller 30 will now be described with reference to FIGS. 2 and 3. The controller 30 monitors the internal temperature of the fuel cell 13 or the temperature of the cooling liquid 12 or the like while the fuel cell is operating, and controls the water pump 16 to regulate the flow quantity of the cooling liquid 12 based on the monitored temperature so that the operating temperature of the fuel cell 13 becomes equal to a target temperature. When the temperature of the cooling liquid 12 is low, the controller 30 also switches the rotary valve 15 to the bypass passage 19 side to suppress a further decrease in temperature of the cooling liquid 12. When the temperature of the cooling liquid 12 is high, the controller 30 switches the rotary valve 15 to the radiator 11 side to lower the temperature of the cooling liquid 12 in order to keep the inside of the fuel cell 13 at the target temperature. When the fuel cell is operating, the cooling liquid 12 circulates through the cooling liquid passage 14 and passes through the ion filter 17 so that the impurities (e.g., ions) in the cooling liquid 12 are removed. As a result, an increase in the ion concentration (conductivity) in the cooling liquid 12 is able to be suppressed.

The controller 30 monitors the impurity ion concentration (conductivity) in the cooling liquid 12 even when the fuel cell 13 is not operating or when a system of a vehicle equipped with the fuel cell is turned off. That is, when the fuel cell 13 is not operating or when a system of a vehicle equipped with the fuel cell is turned off, a water pump intermittent operation control mode is executed (i.e., YES in step S12) according to an output generated cyclically by an internal timer.

The controller 30 reads the output from the conductivity detection meter 41 (step S14). When the water pump 16 is stopped by operation of the fuel cell 13 being stopped or a system in a vehicle equipped with the fuel cell being turned off, the impurity ion concentration (conductivity) in the cooling liquid 12 gradually increases, as shown in the graph in FIG. 3 which shows the conductivity corresponding to the impurity ion concentration in the cooling liquid 12.

If the impurity ion concentration (conductivity) in the cooling liquid 12 immediately after operation of the fuel cell system is stopped falls below an upper limit reference value $\rho$ max (i.e., NO in step S16) and also below a lower limit reference value $\rho$ min (i.e., YES in step S22), the controller 30 confirms that the water pump 16 is stopped (i.e., NO in step S24), and the control ends (step S29).

Figure 3:
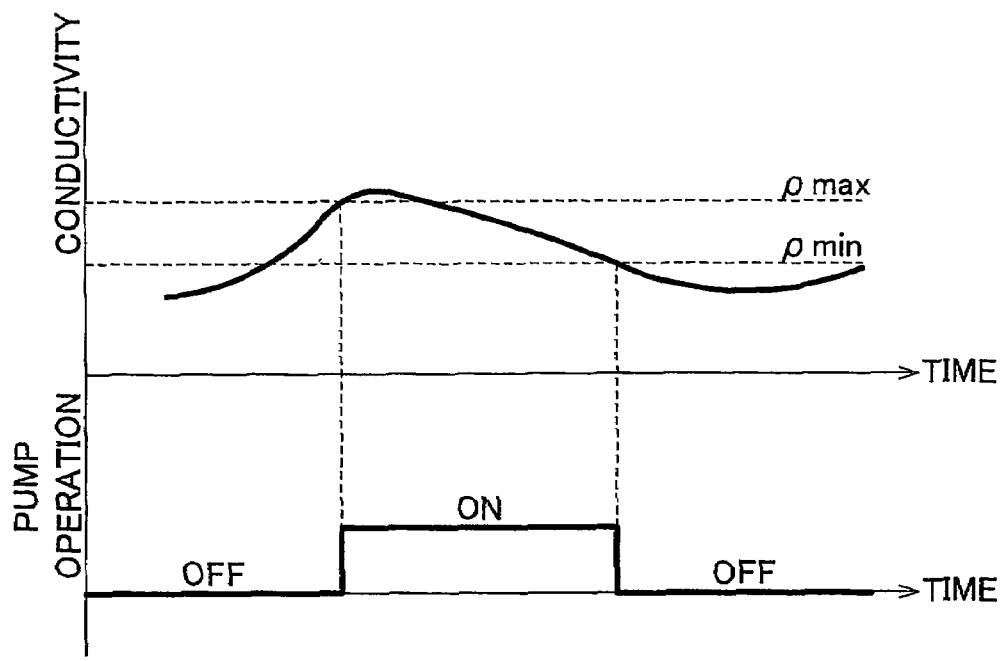
FIG. 3 is an operation timing graph illustrating the operation according to the first exemplary embodiment.

If the controller 30 determines that the impurity ion concentration (conductivity) exceeds the upper limit reference value $\rho$ max, as shown in FIG. 3 (i.e., YES in step S16), the controller 30 sets the water pump flag to ON (step S18) and controls the drive circuit 43 to activate the water pump 16 (step S20), after which the control ends (step S29). When the water pump 16 is activated, it circulates the cooling liquid 12 through the cooling liquid passage 14 so that the impurity ions are removed from the cooling liquid 12 by the ion filter 17.

The controller 30 monitors the impurity ion concentration in the cooling liquid 12 at predetermined sampling cycles, and activates the water pump 16 when the impurity ion concentration in the cooling liquid 12 becomes greater than the upper limit reference value $\rho$ max (steps S12 to S20, and S29).

If the water pump 16 is activated to remove the impurity ions in the cooling liquid 12 with the ion filter 17, and as a result thereof, the impurity ion concentration is reduced such that the impurity ion concentration is less than the upper limit reference value $\rho$ max (i.e., NO in step S16) but equal to, or greater than, the lower limit reference value (i.e., NO in step S22), the controller 30 continues to operate the water pump 16 and the control ends (steps S16, S22, and S29).

If the impurity ion concentration in the cooling liquid 12 decreases so that it is less than the lower limit reference value $\rho$ min (i.e., YES in steps S16 and S22), the controller 30 confirms that the water pump flag is ON (i.e., that the water pump 16 is operating; i.e., YES in step S24) and controls the drive circuit 43 to stop the water pump 16 (step S26). The controller 30 then resets the water pump flag (step S28) and ends the intermittent operation control of the water pump 16 (step S29).

When the water pump 16 is operated (step S20), the controller 30 can set the pump operation time and pump delivery pressure (i.e., pump operating quantities) and the like based on the state-of-charge (hereinafter, simply referred to as "SOC") of the secondary battery 42. This enables the time that the secondary battery 42 can be used to be extended as long as possible.

As a result, the controller 30 is able to reduce the impurity ion concentration (conductivity) and thereby suppress a decrease in the insulating resistance of the cooling liquid 12 circulating through the fuel cell 13 by constantly monitoring the impurity ion concentration (conductivity) in the cooling liquid 12 by monitoring the output from the conductivity detection meter 41 at predetermined cycles, and removing impurity ions in the cooling liquid 12 by intermittently operating the water pump 16, as shown in FIG. 3. This obviates the need for an impurity ion removal process to increase the insulating resistance of the cooling liquid at startup of the fuel cell, and therefore shortens the startup time of the fuel cell. Also, because the controller 30 operates the pump intermittently, that is, only when necessary and then only for the amount of time necessary, the amount of electric energy consumed by the secondary battery 42 is able to be kept to the absolute minimum.

According to the first exemplary embodiment, hunting, in which the water pump 16 is turned on and off repeatedly and often, is prevented by performing control in which the water pump 16 is activated when the impurity ion concentration exceeds the upper limit reference value $\rho$ max, and stopped when the impurity ion concentration is falls below the lower limit reference value $\rho$ min (see FIG. 3). Alternatively, the water pump 16 may be activated for a predetermined period of time when the impurity ion concentration exceeds the upper limit reference value $\rho$ max, and then stopped once that predetermined period of time has passed. This predetermined period of time can be determined based on a characteristic in which the conductivity decreases as the operating time of the water pump 16 increases, in the cooling system of each fuel cell, as shown in FIG. 3, that is obtained through experimentation.

Figure 4:
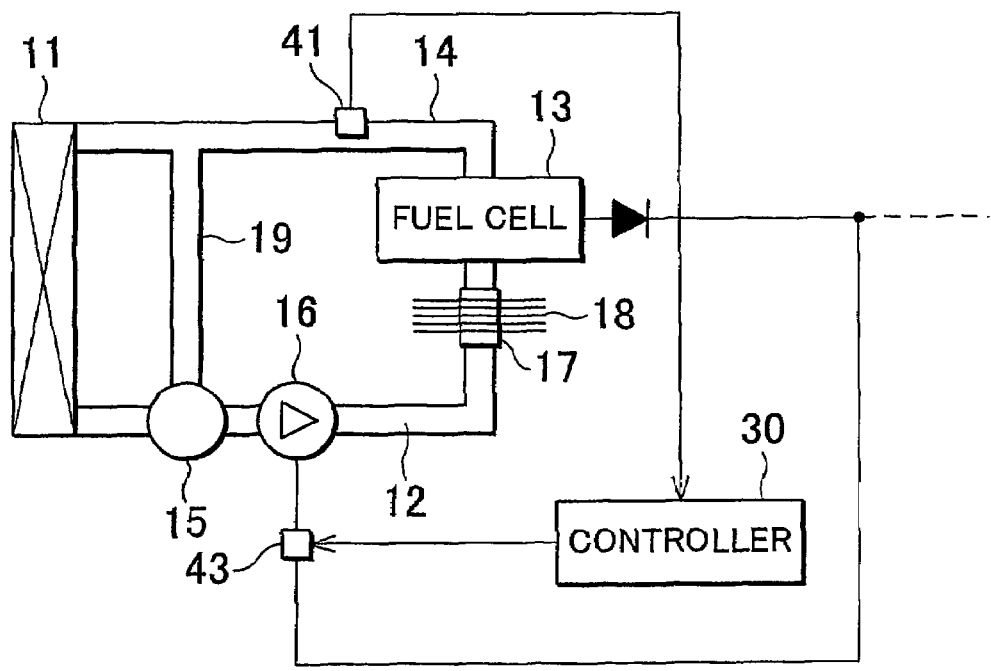
FIG. 4 is a view showing a second exemplary embodiment of the invention.
Figure 5:
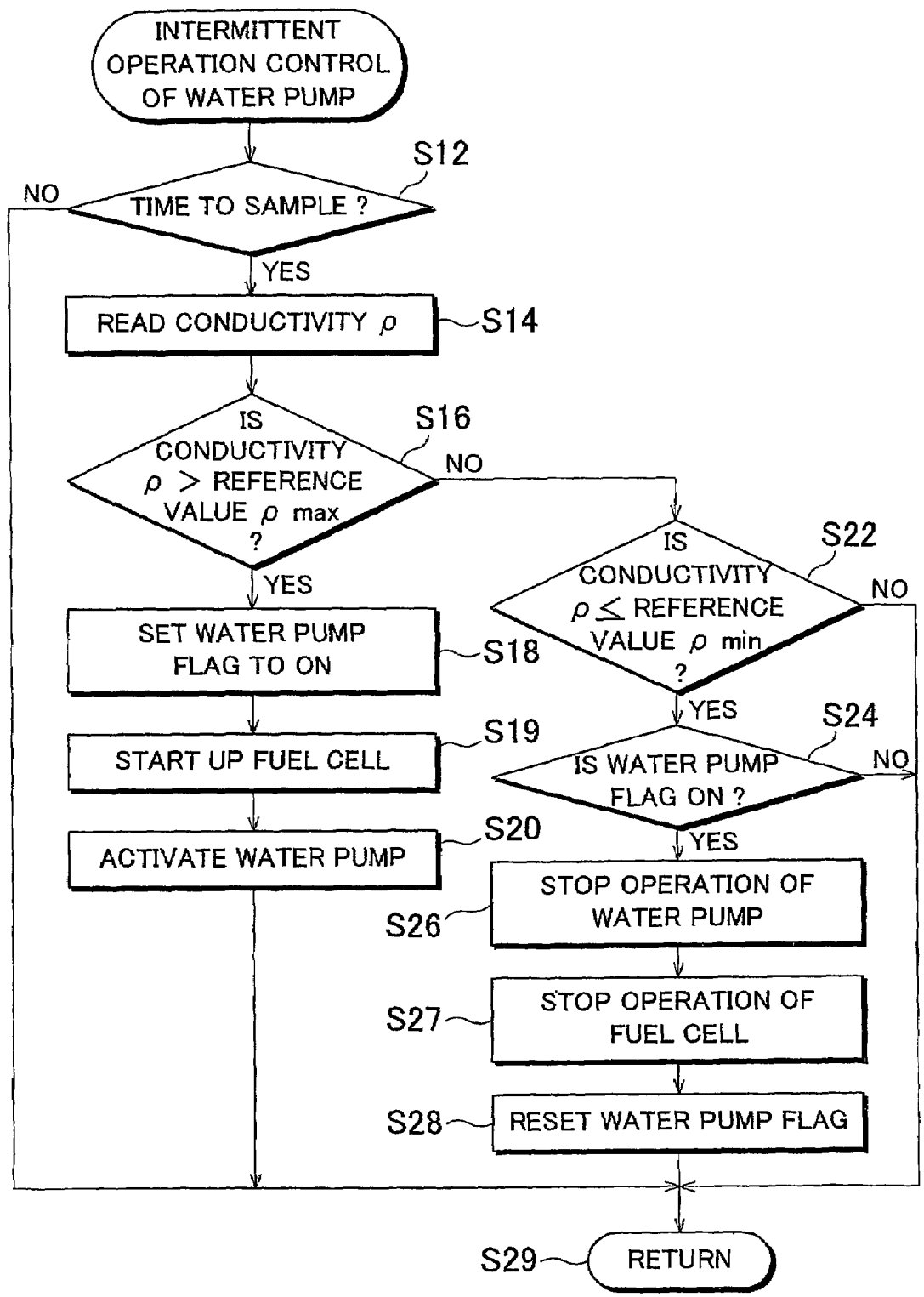
FIG. 5 is a flowchart illustrating the control operation of the controller according to the second exemplary embodiment.

A second exemplary embodiment of the invention will now be described with reference to FIGS. 4 and 5. FIG. 4 schematically shows a cooling system of a fuel cell system which intermittently activates the water pump according to the second exemplary embodiment. In the description of the second exemplary embodiment, portions of the cooling system of the fuel cell system shown in FIGS. 4 and 5 that correspond to portions of the cooling system of the fuel cell system shown in FIG. 1 will be referred to using the same reference characters and nomenclature used in the description of the first exemplary embodiment. Redundant descriptions thereof will be omitted. FIG. 5 is a flowchart illustrating the control of the controller 30 over the cooling system of the fuel cell system according to the second exemplary embodiment.

In the first exemplary embodiment, the water pump 16 is driven by the secondary battery 42, while in the second exemplary embodiment, the fuel cell 13 is started and used to drive the water pump 16. Therefore, the second exemplary embodiment may be applied to a case in which the secondary battery 42 is not provided in the fuel cell system, or if the secondary battery 42 is provided, to a case in which the SOC of the secondary battery 42 is low, or to a case in which there is a problem with the secondary battery 42 (such as battery failure or a reduction in battery function).

In the second exemplary embodiment the secondary battery 42 is not provided, as is evident in FIG. 4. Even if the secondary battery 42 is provided, the fuel cell 13 is still used as the source for supplying power to drive the water pump 16 when the fuel cell 13 is not operating or when a system of a vehicle equipped with the fuel cell is turned off. The structure of the second exemplary embodiment is otherwise the same as that of the first exemplary embodiment.

Next, the control operation of the controller 30 according to the second exemplary embodiment will be described with reference to FIG. 5. Portions in the flowchart shown in FIG. 5 which correspond to portions in the flowchart shown in FIG. 2 will be referred to by the same reference numerals. The controller 30 monitors the impurity ion concentration (conductivity) in the cooling liquid 12 even while the fuel cell 13 is not operating or when a system of a vehicle equipped with the fuel cell is turned off. That is, when the fuel cell 13 is not operating or when a system of a vehicle equipped with the fuel cell is turned off, the water pump intermittent operation control mode is executed (i.e., YES in step S12) according to an output generated cyclically by an internal timer.

The controller 30 reads the output from the conductivity detection meter 41 (step S14). When the water pump 16 is stopped by operation of the fuel cell 13 being stopped or the system in a vehicle equipped with the fuel cell being turned off, the impurity ion concentration (conductivity) in the cooling liquid 12 gradually increases, as shown in the graph in FIG. 3 which shows the conductivity corresponding to the impurity ion concentration in the cooling liquid 12. If the impurity ion concentration (conductivity) in the cooling liquid 12 immediately after operation of the fuel cell system is stopped falls below the upper limit reference value $\rho$ max (i.e., NO in step S16) and also below the lower limit reference value $\rho$ min (i.e., YES in step S22), the controller 30 confirms that the water pump 16 is stopped (i.e., NO in step S24), and the control ends (step S29).

If the controller 30 determines that the impurity ion concentration (conductivity) exceeds the upper limit reference value $\rho$ max, as shown in FIG. 3 (i.e., YES in step S16), the controller 30 sets the water pump flag to ON (step S18) and supplies air and fuel gas, not shown, to the fuel cell 13, thereby activating it and ensuring that power can be supplied to the water pump 16 (step S19). The controller 30 controls the drive circuit 43 to activate the water pump 16 (step S20), after which the control ends (step S29). When the water pump 16 is activated, it circulates the cooling liquid 12 through the cooling liquid passage 14 so that the impurity ions are removed from the cooling liquid 12 by the ion filter 17.

The controller 30 monitors the impurity ion concentration in the cooling liquid 12 at predetermined sampling cycles, and activates the water pump 16 when the impurity ion concentration in the cooling liquid 12 becomes greater than the upper limit reference value $\rho$ max (steps S12 to S20, and S29). If the water pump 16 is activated to remove the impurity ions in the cooling liquid 12 with the ion filter 17, and as a result thereof, the impurity ion concentration is reduced such that the impurity ion concentration is less than the upper limit reference value $\rho$ max (i.e., NO in step S16) but equal to, or greater than, the lower limit reference value $\rho$ min (i.e., NO in step S22), the controller 30 continues to operate the water pump 16 and the control ends (steps S16, S22, and S29).

If the impurity ion concentration in the cooling liquid 12 decreases so that it is less than the lower limit reference value $\rho$ min (i.e., YES in steps S16 and S22), the controller 30 confirms that the water pump flag is ON (i.e., that the water pump 16 is operating; i.e., YES in step S24) and controls the drive circuit 43 to stop the water pump 16 (step S26). The supply of air and fuel gas to the fuel cell 13 is interrupted and the fuel cell 13 stops operating (step S27). The controller 30 then resets the water pump flag (step S28) and ends the intermittent operation control of the water pump 16 (step S29).

In the second exemplary embodiment as well, the water pump 16 is prevented from being turned on and off often and repeatedly by making the upper limit reference value $\rho$ max, which is used to trigger activation of the water pump 16, different from the lower limit reference value $\rho$ min, which is used to trigger deactivation of the water pump 16.

As a result, the controller 30 is able to prevent a reduction in the insulating resistance of the cooling liquid 12 circulating through the fuel cell 13 by constantly monitoring the impurity ion concentration (conductivity) in the cooling liquid 12 by monitoring the output from the conductivity detection meter 41 at predetermined cycles, and removing impurity ions in the cooling liquid 12 by intermittently operating the water pump 16, as shown in FIG. 3, just as in the first exemplary embodiment. This obviates the need for an impurity ion removal process to increase the insulating resistance of the cooling liquid at startup of the fuel cell, and therefore shortens the startup time of the fuel cell. Also, because the controller 30 activates the water pump 16 by starting up the fuel cell 13 when necessary, this exemplary embodiment may also be applied to a structure in which the secondary battery 42 is not provided (see FIG. 1).

Further, even in the case where the secondary battery 42 is provided, when the SOC of the secondary battery 42 is low, it is possible to drive the water pump 16 while charging the secondary battery 42 by switching from the control mode of the first exemplary embodiment to the control mode of the second exemplary embodiment. This also makes it possible to prevent so-called battery discharge of the secondary battery 42.

In this exemplary embodiment as well, if the impurity ion concentration exceeds the upper limit reference value $\rho$ max, the fuel cell 13 and the water pump 16 may also be activated for a predetermined period of time, and then stopped once that predetermined period of time has passed. This predetermined period of time can be determined based on a characteristic in which the conductivity decreases as the operating time of the water pump 16 increases, in the cooling system of each fuel cell, as shown in FIG. 3, that is obtained through experimentation.

According to the foregoing first and second exemplary embodiments, if the ion concentration (conductivity) in the cooling liquid 12 exceeds a predetermined value when the fuel cell 13 is not operating or when a system of a vehicle equipped with the fuel cell is turned off, the water pump 16 is temporarily operated to remove the ions within the cooling liquid 12.

Further, in both the first and second exemplary embodiments, the ion filter 17 and a heat exchange fins 18, to be described later, may be used in combination to remove the impurities. Doing so increases the time that it takes for the ion concentration (conductivity) in the cooling liquid 12 to exceed the upper limit reference value $\rho$ max, thereby reducing the number of times that the water pump 16 is activated and thus conserving energy.

Figure 6:
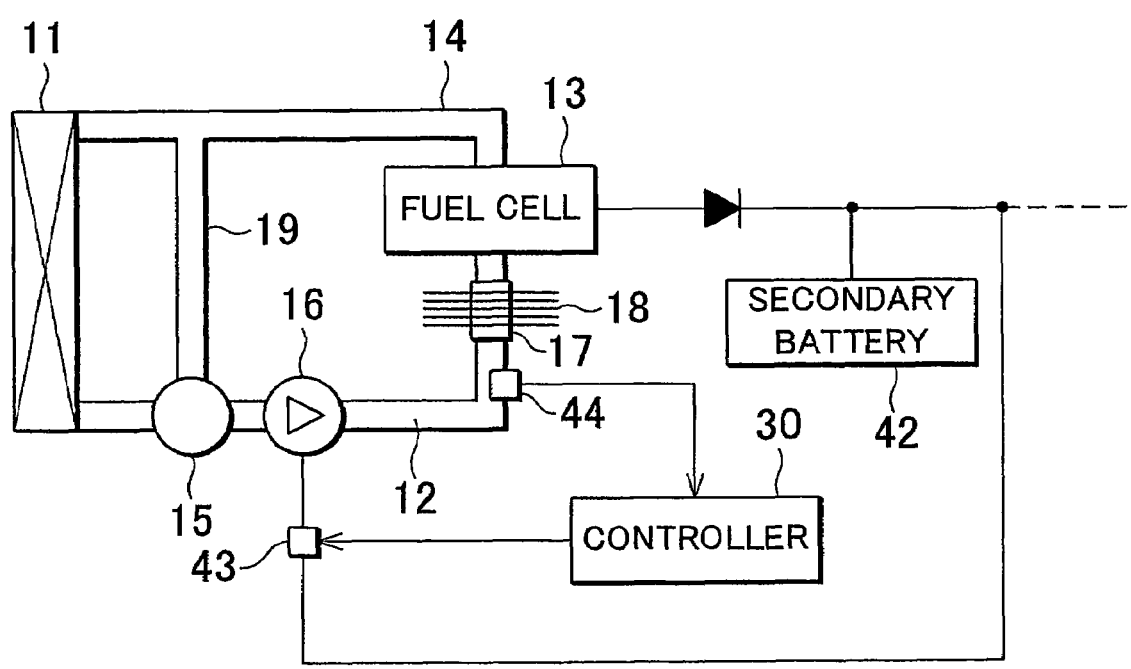
FIG. 6 is a view showing a third exemplary embodiment of the invention.
Figure 7:
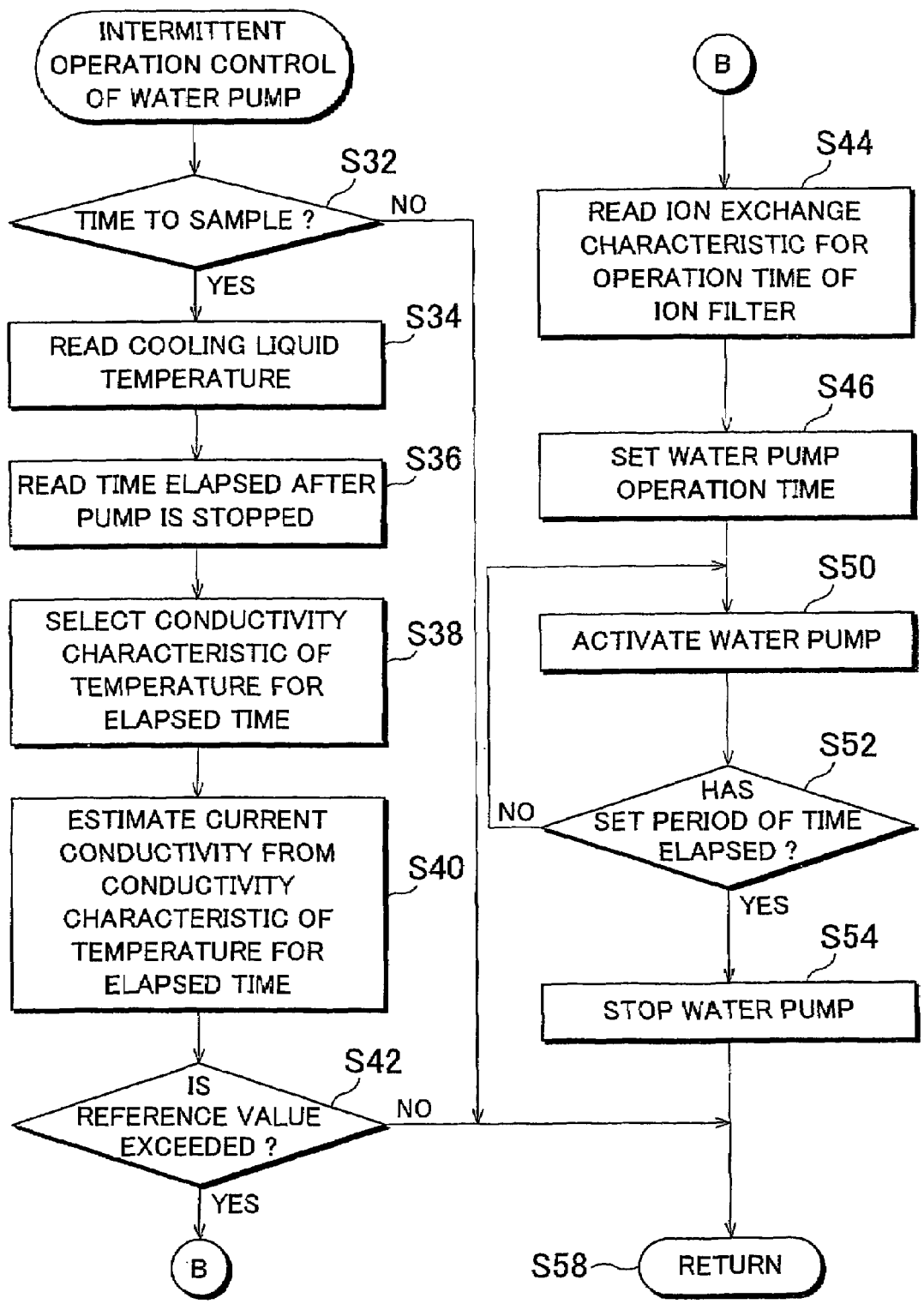
FIG. 7 is a flowchart illustrating the control operation of the controller according to the third exemplary embodiment.
Figure 8:
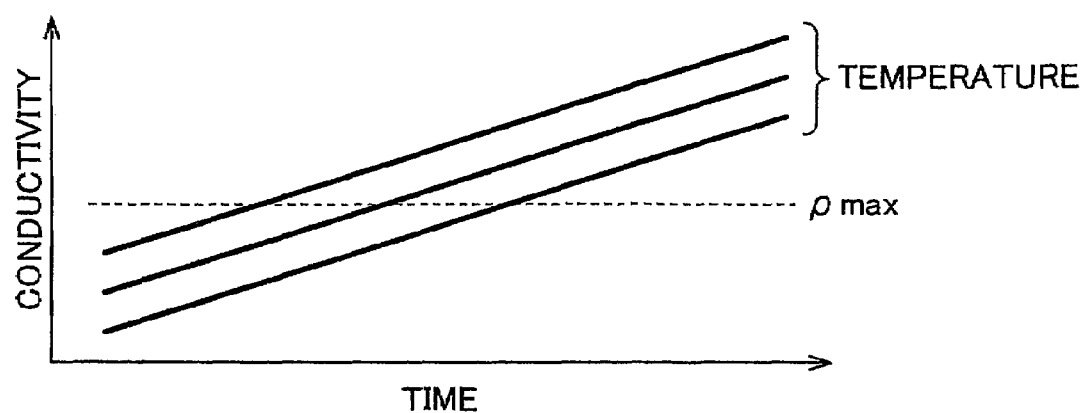
FIG. 8 is a graph illustrating an increase tendency in the conductivity of the cooling liquid.
Figure 9:
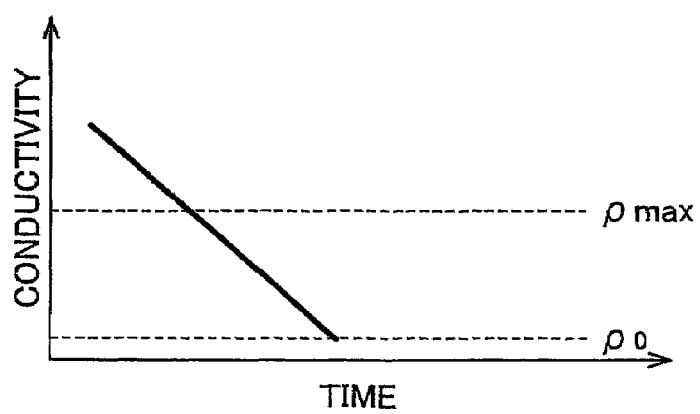
FIG. 9 is a graph illustrating the tendency of the impurity ions in the cooling liquid to decrease over time when the water pump is operating.

A third exemplary embodiment of the invention will now be described with reference to FIGS. 6 to 9. FIG. 6 schematically shows a cooling system of a fuel cell system which intermittently activates a water pump according to the third exemplary embodiment. FIG. 7 is a flowchart illustrating the control of the controller 30 over the cooling system of the fuel cell system according to the third exemplary embodiment. FIG. 8 is a graph showing the tendency of the impurity ion concentration (conductivity) in the cooling liquid 12 to increase over time and as the temperature of the cooling liquid increases. FIG. 9 is a graph showing the tendency of the impurity ion concentration (conductivity) in the cooling liquid 12 to decrease as the water pump 16 is operated and the cooling liquid 12 is pumped through the ion filter 17.

In the third exemplary embodiment, the impurity ion concentration (conductivity) in the cooling liquid 12 is estimated based on the time that has elapsed after operation of the fuel cell 13 was stopped or a system of a vehicle equipped with the fuel cell was turned off, or the time elapsed and the temperature of the cooling liquid 12. If the impurity ion concentration is greater than a predetermined value, the water pump 16 is activated for only a period of time corresponding to the estimated impurity ion concentration.

In the description of the third exemplary embodiment, portions of the cooling system of the fuel cell system shown in FIG. 6 that correspond to portions of the cooling system of the fuel cell system shown in FIG. 1 will be referred to using the same reference characters and nomenclature used in the description of the first exemplary embodiment. Redundant descriptions thereof will be omitted. This exemplary embodiment differs from the first and second exemplary embodiments in that the conductivity detection meter 41 is not included and a temperature gauge 44 for detecting the temperature of the cooling liquid 12 is included. Because the operation control system (not shown) of the fuel cell 13 appropriately includes means for detecting the temperature of each portion of the fuel cell system, including the cooling liquid, outputs therefrom can also be used. The output from the temperature gauge 44 is supplied to the controller 30.

Because temperature and time are factors in the leaching of the ions into the cooling liquid 12 (i.e., the conductivity in the cooling liquid 12), a characteristic of the impurity ion concentration (conductivity) over time (i.e., a map of the increase in the ion concentration (conductivity) according to the cooling liquid temperature and elapsed time), in which the cooling liquid temperature is a parameter, is pre-stored in memory of the controller 30, as shown in FIG. 8. Also, a simpler characteristic of the conductivity increase over time after operation has stopped may also be stored.

An example of a characteristic of the quantity of impurity ions removed with respect to the operating time of the water pump is also stored in the memory of the controller 30, as shown in FIG. 9. The structure of the third exemplary embodiment is otherwise the same as that of the first exemplary embodiment.

Next, the operation of the controller 30 will be described with reference to FIG. 7. The controller 30 monitors the impurity ion concentration (conductivity) in the cooling liquid 12 even when the fuel cell 13 is not operating or when a system of a vehicle equipped with the fuel cell is turned off. That is, during the water pump intermittent operation control, an internal timer, not shown, is started after operation of the fuel cell 13 is stopped or a system of a vehicle equipped with the fuel cell is turned off, and starts to clock the time elapsed after operation of the fuel cell 13 was stopped or the system of a vehicle equipped with the fuel cell was turned off. Also, while the fuel cell is not operating or the vehicle system is turned off, the water pump intermittent operation control is executed according to an output generated cyclically by an internal timer (i.e., YES in step S32).

The controller 30 reads the current output from the temperature gauge 44 (step S34). The controller 30 then reads the output from the internal timer, as well as the time that has passed after operation of the fuel cell 13 was stopped until the present time (step S36). The controller 30 then selects a characteristic curved (or straight) line of the read temperature from among a group of graphed characteristics of the impurity ion concentration (conductivity) over time that are pre-stored in the memory of the controller 30, as shown in FIG. 8 (step S38). The controller 30 reads the impurity ion concentration (conductivity) over time from the selected characteristic curved line and estimates the current impurity ion concentration (conductivity) (step S40). The controller 30 then determines whether the current impurity ion concentration (conductivity) is greater than the upper limit reference value ρ max (step S42).

If the controller 30 determines that the current impurity ion concentration (conductivity) is not greater than the upper limit reference value ρ max (i.e., NO in step S42), the control ends (step S58).

If, on the other hand, the controller 30 determines that the current impurity ion concentration (conductivity) is greater than the upper limit reference value ρ max (i.e., YES in step S42), the controller 30 proceeds to read the characteristic curved (or straight) line shown in FIG. 9, which is stored in memory, and estimates the operating time of the water pump 16 necessary to reduce the current impurity ion concentration (conductivity) to a target concentration (such as the maximum concentration able to be removed by the ion filter, hereinafter referred to as the "removal limit concentration") ρ 0, which is less than the upper limit reference value ρ max (step S44). The controller 30 then sets the internal timer to that estimated operating time (step S46), and controls the drive circuit 43 to start supplying power from the secondary battery 42 to the water pump 16 (step S50). The water pump 16 continues to be operated until the estimated operating time to which the internal timer is set has elapsed (i.e., NO in step S52; step S50).

Once the estimated operating time has elapsed (i.e., YES in step S52), the controller 30 stops the water pump 16 (step S54), resets the internal timer and starts to clock the time between step S54 of this cycle of the routine and step S36 of the next cycle of the routine. The routine ends after step S54 (step S58).

While the water pump is stopped (step S54), the impurity ion concentration (conductivity) is estimated to be at the removal limit concentration ρ0. Therefore, by cyclically repeating steps S32 through S58, the water pump is temporarily activated to remove the impurity ions in the cooling liquid 12 each time a predetermined period of time corresponding to the impurity ion concentration in the cooling liquid 12 (or a set period of time) passes.

If there is no corresponding characteristic curved line for the temperature among the characteristic curved lines shown in FIG. 8, an approximate characteristic curved line for the detected temperature can be obtained from characteristic curved lines that are close using interpolation. The third exemplary embodiment obviates the need for the conductivity detection meter 41 and the control system relating thereto. Because the water pump 16 is operated only intermittently, it is possible to reduce the discharge from the secondary battery 42.

Figure 10:
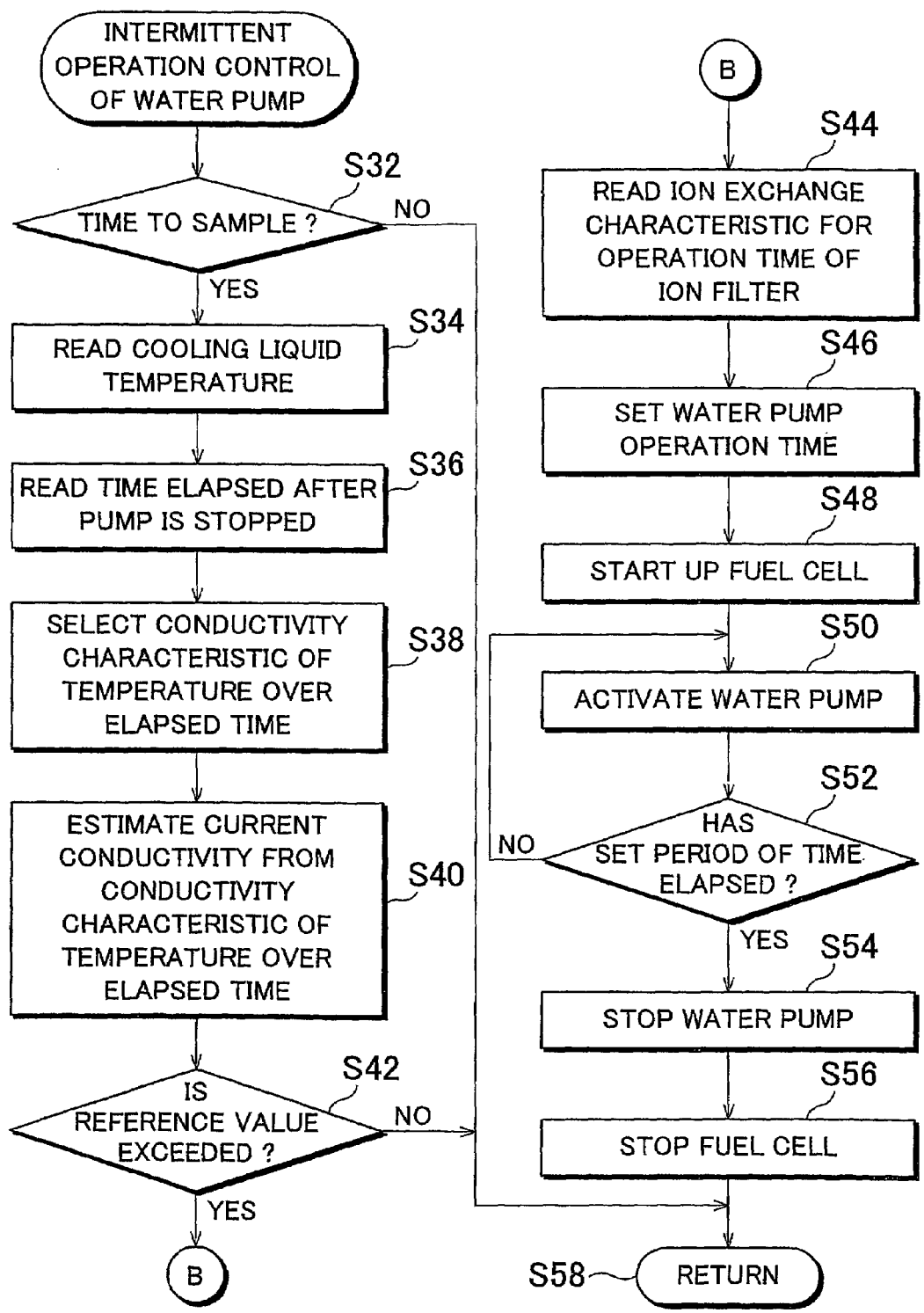
FIG. 10 is a flowchart illustrating the control operation of the controller according to a fourth exemplary embodiment.

A fourth exemplary embodiment will now be described with reference to FIG. 10. According to this exemplary embodiment, the water pump 16 is powered by the fuel cell 13 as opposed to by the secondary battery 42 as in the third exemplary embodiment shown in FIGS. 6 to 9. The structure of the fourth exemplary embodiment is otherwise the same as that of the third exemplary embodiment.

Operation of the controller 34 in this exemplary embodiment will now be described with reference to FIG. 10. The controller 30' monitors the impurity ion concentration (conductivity) in the cooling liquid 12 even when the fuel cell 13 is not operating or when a system of a vehicle equipped with the fuel cell is turned off. That is, during the water pump intermittent operation control, an internal timer, not shown, is started after operation of the fuel cell 13 is stopped or a system of a vehicle equipped with the fuel cell is turned off, and starts to clock the time elapsed after operation of the fuel cell 13 was stopped or the system of a vehicle equipped with the fuel cell was turned off. Also, while the fuel cell is not operating or the vehicle system is turned off, the water pump intermittent operation control is executed according to an output generated cyclically by an internal timer (i.e., YES in step S32).

The controller 30 reads the current output from the temperature gauge 44 (step S34). The controller 30 then reads the output from the internal timer, as well as the time that has passed after operation of the fuel cell 13 was stopped until the present time (step S36). The controller 30 then selects a characteristic curved (or straight) line of the read temperature from among the group of graphed characteristics of the impurity ion concentration (conductivity) over time that are pre-stored in the memory of the controller 30, as shown in FIG. 8 (step S38). The controller 30 reads the impurity ion concentration (conductivity) over time from the selected characteristic curved line and estimates the current impurity ion concentration (conductivity) (step S40).

The controller 30 then determines whether the current impurity ion concentration (conductivity) is greater than the upper limit reference value ρ max (step S42).

If the controller 30 determines that the current impurity ion concentration (conductivity) is not greater than the upper limit reference value ρ max (i.e., NO in step S42), the control ends (step S58).

If, on the other hand, the controller 30 determines that the current impurity ion concentration (conductivity) is greater than the upper limit reference value ρ max (i.e., YES in step S42), the controller 30 proceeds to read the characteristic curved (or straight) line shown in FIG. 9, which is stored in memory, and estimates the operating time of the water pump 16 necessary to reduce the current impurity ion concentration (conductivity) to a target concentration (such as the removal limit concentration) ρ 0, which is less than the upper limit reference value ρ max (step S44).

The controller 30 then sets the internal timer to that estimated operating time (step S46), and controls the drive circuit 43 to start supplying power from the secondary battery 42 to the water pump 16 (step S50). The water pump 16 continues to be operated until the estimated operating time to which the internal timer is set has elapsed (i.e., NO in step S52; step S50).

Once the estimated operating time has elapsed (i.e., YES in step S52), the controller 30 stops the water pump 16 (step S54), resets the internal timer and starts to clock the time between step S54 of this cycle of the routine and step S36 of the next cycle of the routine. The routine ends after step S54. The controller 30 then stops the fuel cell 13 by stopping the supply of air and fuel gas to the fuel cell 13 (step S56), after which this cycle of the routine ends (step S58).

Because the water pump 16 is driven by the fuel cell 13, this fourth exemplary embodiment can also be applied to a case in which the secondary battery 42 is not provided. Also, in a case where the secondary battery 42 is provided, the secondary battery 42 can be charged while the water pump is operating.

Furthermore, in a case where the secondary battery 42 is provided, when the secondary battery 42 has a sufficient electric charge, it can be used to supply power to the water pump 16, as in the third exemplary embodiment. Then, if the secondary battery 42 becomes over-discharged, control can be switched so that the fuel cell 13 is started and used to supply power to the water pump 16, as in the fourth exemplary embodiment.

A fifth exemplary embodiment of the invention will be described with reference to FIG. 11. Portions in FIG. 11 corresponding to portions in FIG. 1 will be referred to by the same reference numerals, and descriptions of those portions will be omitted.

In the fifth exemplary embodiment, the cooling system of the fuel cell is designed such that the cooling liquid is stored in a main tank and the impurity ions in the cooling liquid in the main tank are removed using the ion filter. This exemplary embodiment suppresses an increase in the impurity ion concentration (conductivity) in the cooling liquid by intermittently driving the water pump to pass the cooling liquid in the main tank through the ion filter when the fuel cell is not operating or when a system of a vehicle equipped with the fuel cell is turned off.

Figure 11:
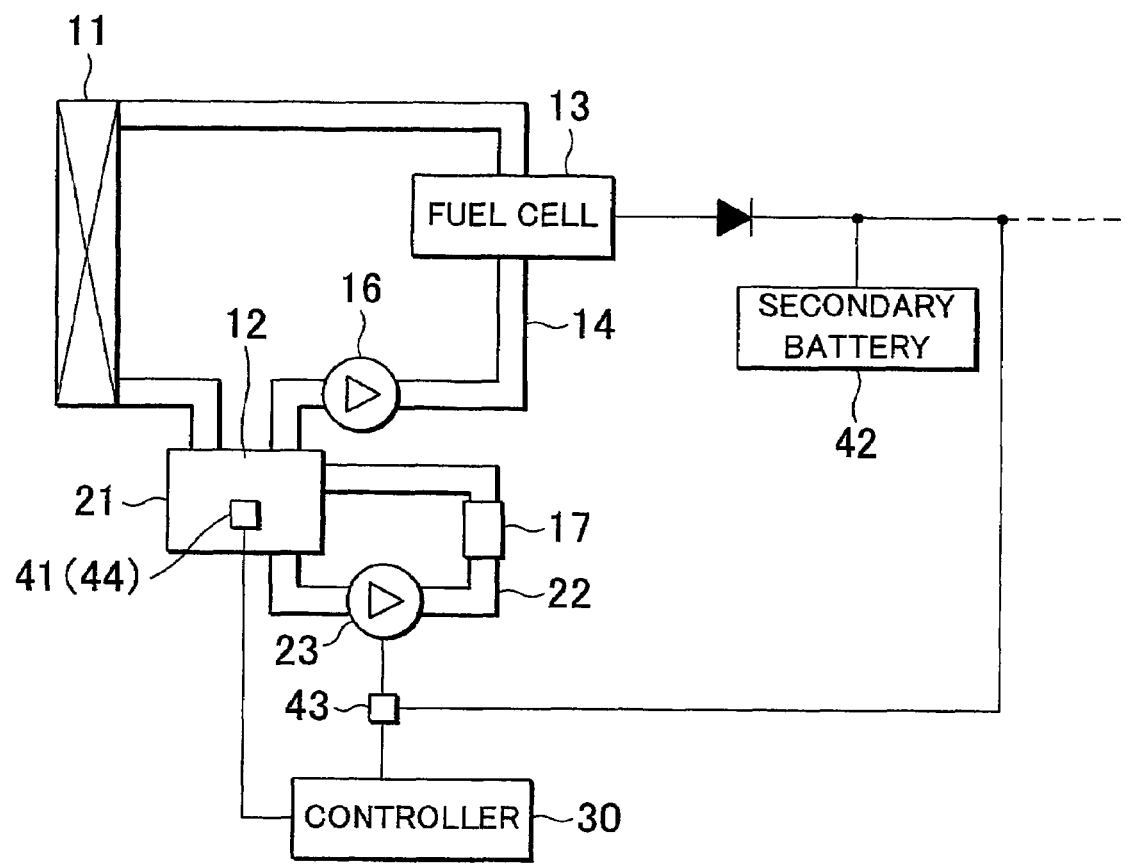
FIG. 11 is a view showing a fifth exemplary embodiment of the invention.

Referring to FIG. 11, the radiator 11, the fuel cell 13, the water pump 16, and a main tank 21 are connected to the cooling liquid passage 14. Operating the water pump 16 circulates the cooling liquid 12 through the fuel cell 13. A water pump 23 and the ion filter 17 are connected via a cooling liquid sub-passage 22 to the main tank 21 that stores the cooling liquid 12. Operating the water pump 23 circulates the cooling liquid 12 in the main tank 21 through the ion filter 17. The water pumps 16 and 23 are both controlled by the controller 30. The conductivity detection meter 41 is provided in the main tank and outputs the detection results to the controller 30. The structure of the cooling system of the fuel cell is otherwise the same as that shown in FIG. 1.

Therefore, if the impurity ion concentration exceeds a predetermined value, the controller 30 controls, based on the foregoing impurity ion concentration (conductivity), the water pump 23 either according to the first exemplary embodiment (see FIG. 2), in which it activates the water pump 23 intermittently, or according to the second exemplary embodiment (see FIG. 5), in which it activates the water pump 23 intermittently in the same way, but after first starting up the fuel cell 13. The controller 30 may also activate the water pump 16 in addition to the water pump 23, thus enabling impurities within the fuel cell 13, the cooling liquid passage 14, and the radiator 11 to be removed.

If the temperature gauge 44 is used instead of the conductivity detection meter 41, the controller 30 estimates the impurity ion concentration (conductivity) according to the amount of time that has passed, and controls the water pump 23 either according to the third exemplary embodiment (see FIG. 7), in which it activates the water pump 23 intermittently, or according to the fourth exemplary embodiment (see FIG. 10), in which it activates the water pump 23 intermittently in the same way, but after first starting up the fuel cell 13.

Alternatively in the fifth exemplary embodiment, when the fuel cell 13 is not operating or when a system of a vehicle equipped with the fuel cell is turned off, the water pump 23 may be supplied first with power from the secondary battery 42, and the fuel cell 13 started when the secondary battery 42 over-discharges (i.e., lacks sufficient electrical charge).

In the cooling system of the fuel cell according to the fifth exemplary embodiment, the ion filter 17 is provided in the cooling liquid sub-passage 22, which results in less pressure loss, and is therefore more advantageous, than when the ion filter 17 is provided in the cooling liquid passage 14. This structure also enables the time required for startup of the fuel cell to be shortened by suppressing an increase in the impurity ion concentration in the cooling liquid by driving the water pump intermittently when the fuel cell 13 is not operating or when a system of a vehicle equipped with the fuel cell is turned off.

A sixth exemplary embodiment of the invention will be described with reference to FIG. 12. Portions in FIG. 12 corresponding to portions in FIG. 1 will be referred to by the same reference numerals, and descriptions of those portions will be omitted.

Each of the foregoing embodiments is designed to suppress an increase in the impurity ion concentration (conductivity) in the cooling liquid when the fuel cell 13 is not operating or when a system of a vehicle equipped with the fuel cell is turned off by passing the cooling liquid through the ion filter. In each of the foregoing exemplary embodiments, this is done by creating a temperature difference in the cooling liquid passage which generates convection therein. This convection acts to force the cooling liquid through the ion filter, thereby reducing the impurity ion concentration (conductivity) in the cooling liquid.

In the sixth exemplary embodiment, a hydrogen-absorbing alloy tank 51 is provided which temporarily stores excess hydrogen while the fuel cell 13 is operating. This hydrogen-absorbing alloy is an alloy that becomes a metal hydride compound which reacts with hydrogen. The hydrogen-absorbing alloy has the properties of, when subjected to hydrogen gas, absorbing hydrogen and generating heat when either the gas pressure increases or the temperature of the hydrogen-absorbing alloy decreases, and releasing hydrogen and absorbing heat when either the gas pressure decreases or the temperature of the hydrogen-absorbing alloy increases. This heat in the hydrogen-absorbing alloy tank 51 is used as a heat source for generating convection in the cooling liquid 12.

Figure 12:
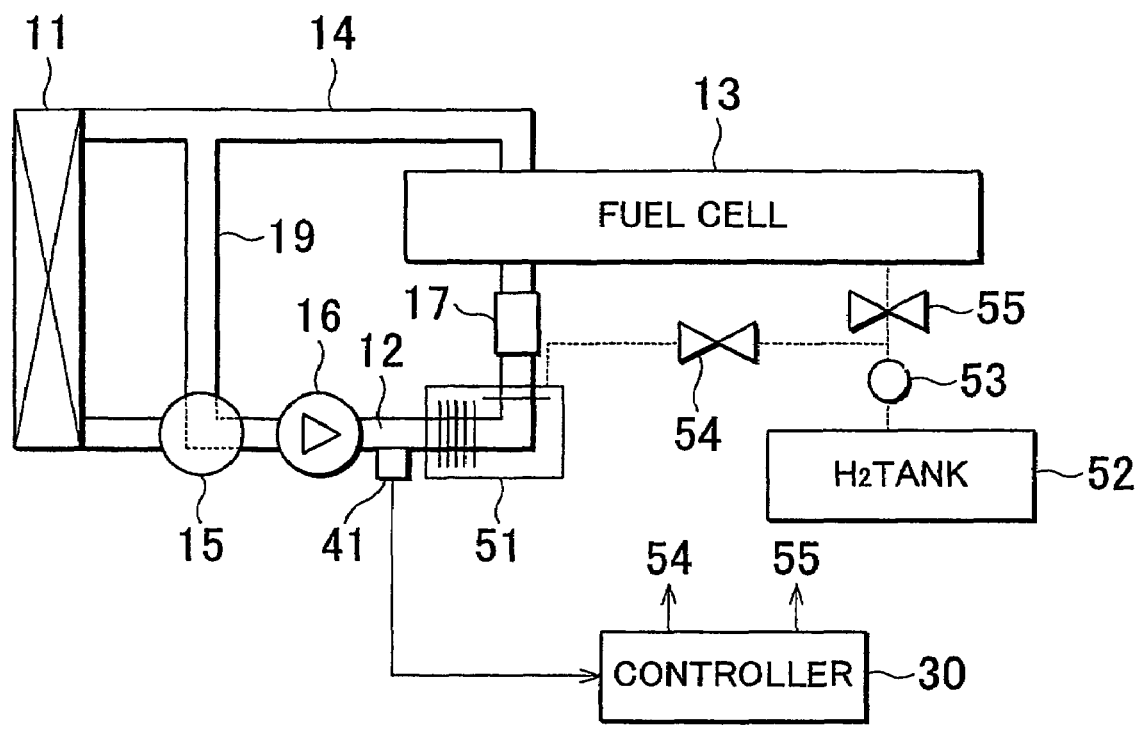
FIG. 12 is a view showing a sixth exemplary embodiment of the invention.

Referring to FIG. 12, the hydrogen-absorbing alloy tank 51 is disposed between the water pump 16 and the ion filter 17. The cooling liquid passage 14 which connects the water pump 16 and the ion filter 17 passes through the hydrogen-absorbing alloy tank 51. Fins which perform heat exchange between the cooling liquid 12 and the hydrogen gas are formed on the cooling liquid passage 14 inside the hydrogen-absorbing alloy tank 51. The hydrogen absorbing alloy which absorbs or releases the hydrogen gas is provided inside of the hydrogen-absorbing alloy tank 51.

A gas supply line connects the hydrogen-absorbing alloy tank 51 with a high pressure tank 52, used to store the hydrogen gas, via a pressure reduction valve 53 and a flow valve 54. Another gas supply line connects the high pressure tank 52 with the fuel cell 13 via the pressure reduction valve 53 and a flow valve 55. The conductivity detection meter 41, which detects the impurity ion concentration (conductivity) in the cooling liquid 12, is provided in the cooling liquid passage 14. Output from the conductivity detection meter 41 is sent to the controller 30.

The supply system used to supply air to the fuel cell 13 is not shown in the drawing. The controller 30 monitors the impurity ion concentration (conductivity) and controls the pressure reduction valve 53 and the flow valves 54 and 55. The structure of the fifth exemplary embodiment is otherwise the same as that of the first exemplary embodiment.

Operation of this exemplary embodiment is as follows. Before operation of the fuel cell 13 is stopped or the system of a vehicle equipped with the fuel cell is turned off, the controller 30 preferably switches the rotary valve 15 to the bypass passage 19 side so as to reduce the resistance in the cooling liquid passage 14 and facilitate circulation of the cooling liquid 12 through the ion filter 17 (This will be applied to the examples shown in FIGS. 13 and 15, described later).

When the fuel cell 13 is not operating or when a system of a vehicle equipped with the fuel cell is turned off and either the controller 30 detects an increase in the impurity concentration (conductivity) in the cooling liquid 12 (see FIG. 2, for example) or a predetermined period of time corresponding to a threshold level impurity concentration (conductivity) has passed (see FIG. 7, for example), the controller 30 allows hydrogen to flow from the high pressure hydrogen tank 52 to the hydrogen-absorbing alloy tank 51 via the pressure reduction valve 53 and the flow valve 54, thus raising the internal pressure of the hydrogen-absorbing alloy tank 51 and causing the hydrogen absorbing alloy to absorb hydrogen. As a result, heat is generated in the hydrogen-absorbing alloy tank 51.

The cooling liquid passage 14 passes through the hydrogen-absorbing alloy tank 51 and heat from the hydrogen-absorbing alloy is transferred to the cooling liquid 12 in the cooling liquid passage 14 via the fins. As a result, a temperature difference is created between the part of the cooling liquid passage 14 with fins and the part of the cooling liquid passage 14 without fins. This temperature difference generates convection which circulates the cooling liquid 12 through the ion filter 17, thereby reducing the impurities (e.g., ions). In this example, the hydrogen-absorbing alloy tank 51 and the fins correspond to the heat transferring means. When the impurity concentration (conductivity) in the cooling liquid 12 falls or a predetermined quantity of hydrogen is sent into the hydrogen-absorbing alloy tank 51 from the high pressure tank 52, the controller 30 closes the pressure reduction valve 53 and the flow valve 54 and stops the supply of the hydrogen. The controller 30 repeats the operation to reduce the impurity concentration (conductivity) for as long as the hydrogen-absorbing alloy is able to absorb hydrogen.

When the hydrogen-absorbing alloy tank 51 can no longer absorb any more hydrogen or when a command has been given to start the vehicle equipped with the fuel cell, the controller 30 opens the pressure reduction valve 53 and the flow valve 55 so that hydrogen in the high pressure tank 52 flows to the fuel cell 13, which it then starts. When the fuel cell 13 starts, the temperature of the cooling liquid 12 increases. When the cooling liquid passage 14 and the fins inside the hydrogen-absorbing alloy tank 51 heat up from the cooling liquid 12, thereby causing the hydrogen-absorbing alloy to heat up, hydrogen is released from the hydrogen-absorbing alloy inside the hydrogen-absorbing alloy tank 51. The controller then opens the flow valve 54 so as to allow the hydrogen released from the hydrogen-absorbing alloy tank 51 to flow via the flow valve 55. When the hydrogen in the hydrogen-absorbing alloy tank 51 has been released, it can be used to heat the cooling liquid 12 the next time. The hydrogen-absorbing alloy tank 51 may also be disposed at the outlet of the fuel cell 13 or near the radiator 11. Providing the hydrogen-absorbing alloy tank 51 near the radiator 11 makes it possible to increase the temperature difference between the radiator and the tank.

Instead of operating the water pump 16 to force the cooling liquid 12 through the ion filter 17 to remove impurity ions from the cooling liquid 12 when the impurity ion concentration (conductivity) in the cooling liquid 12 has increased while the fuel cell 13 is not operating or when a system of a vehicle equipped with the fuel cell is turned off, this exemplary embodiment generates convection in the cooling liquid passage using heat generated by the hydrogen-absorbing alloy, and uses this convection to carry the cooling liquid 12 through the ion filter 17 to remove impurity ions in the cooling liquid 12. As a result, this exemplary embodiment reduces the amount of electric energy consumed in removing impurity ions from the cooling liquid 12.

A seventh exemplary embodiment of the invention will be described with reference to FIG. 13. Portions in FIG. 13 corresponding to portions in FIG. 1 will be referred to by the same reference numerals, and descriptions of those portions will be omitted.

In the seventh exemplary embodiment, a thermoelectric element is provided in the cooling liquid passage in order to create a temperature difference in the cooling liquid passage when the fuel cell 13 is not operating or when a system of a vehicle equipped with the fuel cell is turned off. Accordingly, if the impurity ion concentration (conductivity) in the cooling liquid exceeds a reference value, or if a predetermined period of time corresponding to an increase in the impurity ion concentration in the cooling liquid has passed, the thermoelectric element is energized to generate convection in the cooling liquid passage. This convection circulates the cooling liquid through the ion filter thereby suppressing an increase in the impurity ion concentration (conductivity) in the cooling liquid.

Figure 13:
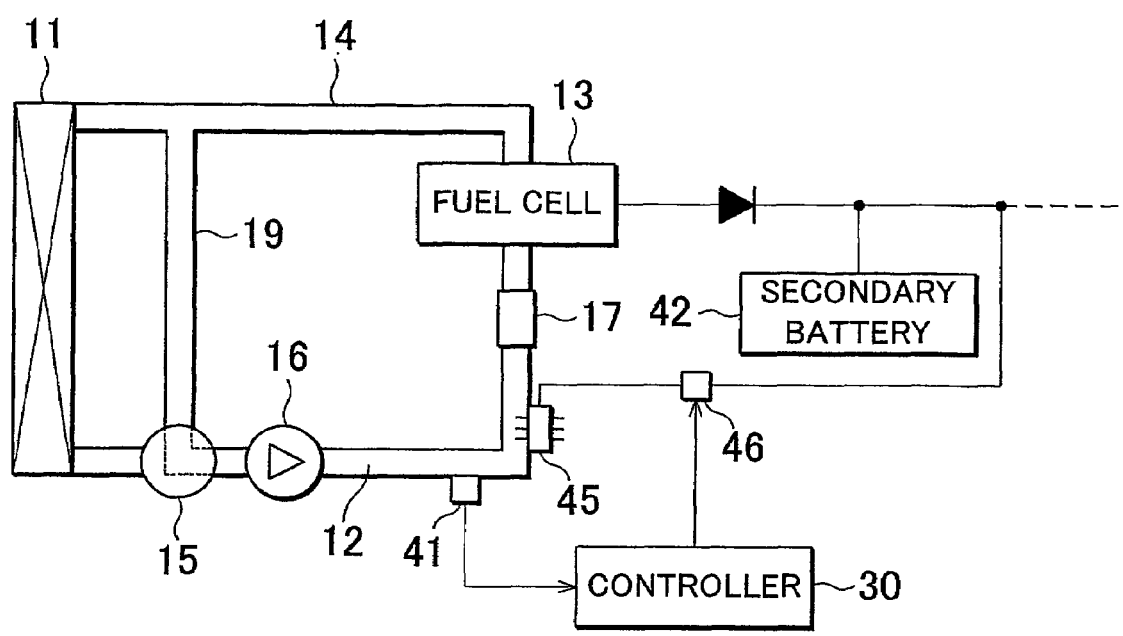
FIG. 13 is a view showing a seventh exemplary embodiment of the invention.

As shown in FIG. 13, in this exemplary embodiment, a thermoelectric element 45, used as the heat source to create convection in the cooling liquid passage 14, is provided in the cooling liquid passage 14 that connects the water pump 16 to the ion filter 17. Power to the thermoelectric element 45 is supplied by the secondary battery 42 via a drive circuit (or switch circuit) 46. Further, the conductivity detection meter 41 provided in the cooling liquid passage 14 detects the impurity ion concentration (conductivity) in the cooling liquid 12 and outputs a signal indicative thereof to the controller 30. The structure is otherwise the same as that shown in FIG. 1. The thermoelectric element 45 may alternatively be provided at the outlet of the fuel cell 13 or near the radiator 11 or the like.

According to the structure in this exemplary embodiment, if, as described above, the impurity ion concentration (conductivity) exceeds the reference value after operation of the fuel cell 13 is stopped or a system of a vehicle equipped with the fuel cell is turned off (see FIG. 2, for example), or a predetermined period of time has passed after operation of the fuel cell 13 has stopped (see FIG. 7, for example), the controller 30 controls the thermoelectric element 45 so that it functions as a heat source (or heat exchanger) to generate a convection current in the cooling liquid 12 which carries the cooling liquid 12 through the ion filter 17 to remove the ions. The thermoelectric element 45 may be operated intermittently.

An eighth exemplary embodiment of the invention will be described with reference to FIG. 14. Portions in FIG. 14 corresponding to portions in FIG. 1 will be referred to by the same reference numerals, and descriptions of those portions will be omitted.

In this exemplary embodiment, the cooling liquid that is heated during operation of the fuel cell is used as the heat source to create the temperature difference in the cooling liquid passage when the fuel cell 13 is not operating or when a system of a vehicle equipped with the fuel cell is turned off.

Figure 14:
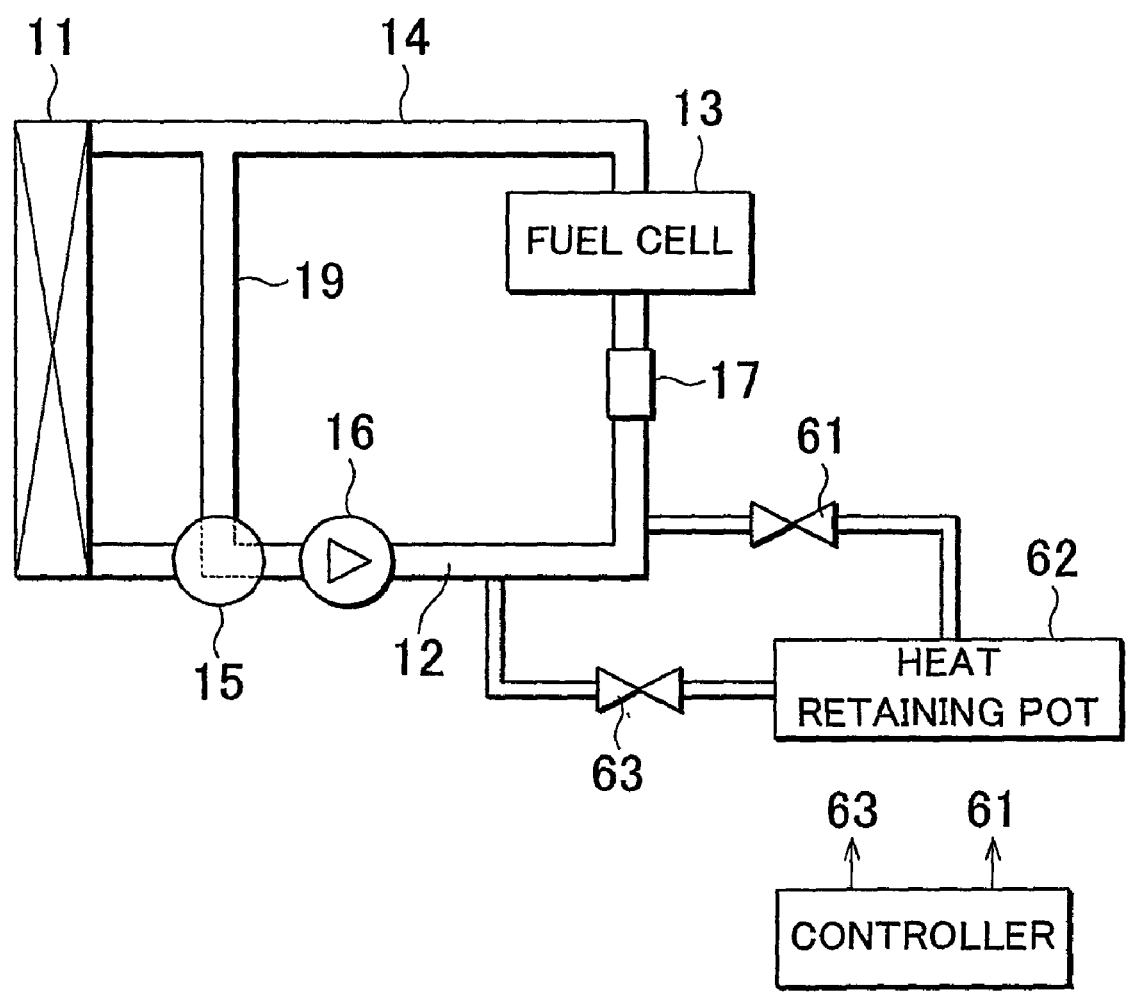
FIG. 14 is a view showing an eighth exemplary embodiment of the invention.

Referring to FIG. 14, this exemplary embodiment is provided with a heat retaining pot (heat retaining container) 62 as an accumulator that is connected via flow valves 61 and 63 to the cooling liquid passage 14 which connects the water pump 16 and the ion filter 17. The structure, such as the radiator 11, the fuel cell 13, the cooling liquid passage 14, the rotary valve 15, and the water pump 16, is the same as the example shown in FIG. 1.

The controller 30 in this exemplary embodiment opens the flow valves 61 and 63 during operation of the fuel cell 13 to let heated cooling liquid 12 into the heat retaining pot 62. The controller 30 then closes the flow valves 61 and 63 and stores the heated cooling liquid 12 in the heat retaining pot 62 where it is kept heated. If the impurity ion concentration (conductivity) in the cooling liquid 12 rises while the fuel cell 13 is not operating or when a system of a vehicle equipped with the fuel cell is turned off (see FIG. 2, for example) or when a predetermined period of time has passed after the fuel cell 13 was stopped (see FIG. 7, for example), the controller 30 opens the flow valves 61 and 63 and allows the heated cooling liquid 12 to flow out of the heat retaining pot 62 to create convection within the cooling liquid passage 14. The cooling liquid 12 is thus circulated through the ion filter 17 to reduce the ions within the cooling liquid 12 and lower the impurity concentration (conductivity). The heat retaining pot 62 may alternatively be provided at the outlet of the fuel cell 13 or near the radiator 11.

According to another control mode of the controller 30, heat from an outside portion other than the cooling liquid passage 14 may be stored in the cooling liquid in the heat retaining pot 16. Further, in the case of a vehicle equipped with a fuel cell, waste heat from a motor, air conditioner, or inverter or the like in the vehicle may also be accumulated in the heat retaining pot. Accordingly, a convection current can be generated in the cooling liquid 12 using the waste heat.

Figure 15:
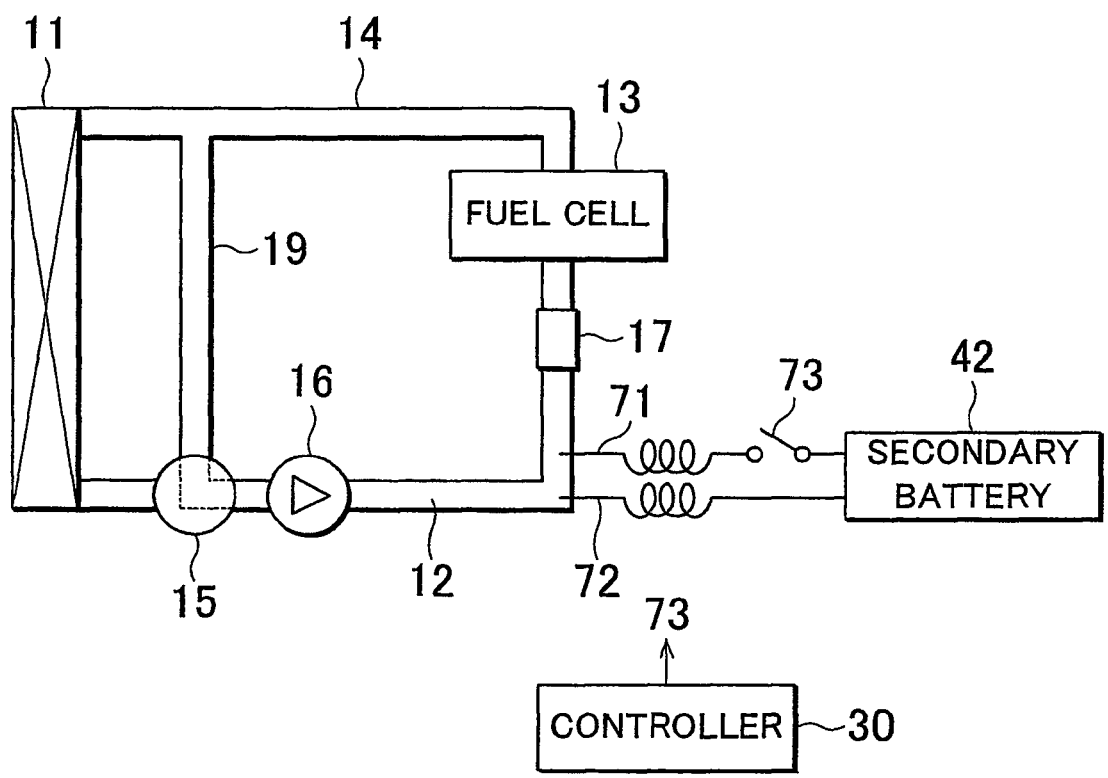
FIG. 15 is a view showing a ninth exemplary embodiment of the invention.

A ninth exemplary embodiment of the invention will be described with reference to FIGS. 15 and 16. Portions in FIG. 15 corresponding to portions in FIG. 1 will be referred to by the same reference numerals, and descriptions of those portions will be omitted.

This exemplary embodiment uses the cooling liquid itself as the heat generating body (i.e., heat source). Also, the impurity ion concentration (conductivity) in the cooling liquid is used to control the heating current. Referring to FIG. 15, a pair of electrodes 71 and 72 are disposed opposing another inside the cooling liquid passage 14 between the water pump 16 and the ion filer 17. A voltage can be applied to these electrodes 71 and 72 from the secondary battery 42 via a switch 73. The structure, such as the radiator 11, the fuel cell 13, the cooling liquid passage 14, the rotary valve 15, and the water pump 16, is the same as the example shown in FIG. 1.

The controller 30 according to this structure closes the switch 73 when the fuel cell 13 is not operating or when a system of a vehicle equipped with the fuel cell is turned off so that voltage is applied from the secondary battery 42. When the impurity ion concentration (conductivity) is high, a relatively large electric current flows between the electrodes 71 and 72. When the impurity ion concentration (conductivity) is low, a relatively small electric current flows between the electrodes 71 and 72.

Therefore, when the impurity ion concentration (conductivity) is low (i.e., the electric current is small), either no heat is generated in the cooling liquid 12 between the electrodes 71 and 72, or if heat is generated, it is not enough to create convection in the cooling liquid passage 14. When the impurity ion concentration (conductivity) is high (i.e., the electric current is large), the amount of heat generated in the cooling liquid 12 between the electrodes 71 and 72 is relatively large so the cooling liquid 12 between the electrodes 71 and 72 heats up to the point where convection is created in the cooling liquid passage 14. This convection in turn causes the cooling liquid 12 to flow through the ion filer 17 such that impurities (such as ions, dissolved material, and particles) are removed.

According to this exemplary embodiment, the impurity ion concentration (conductivity) in the cooling liquid 12 decreases when the cooling liquid 12 is circulated through the ion filter 17. When the impurity ion concentration (conductivity) drops, the electric current running between the electrodes 71 and 72 is either reduced to an extremely small amount or stopped altogether. When heat is no longer generated in the cooling liquid 12 between the electrodes 71 and 72, circulation of the cooling liquid 12 by the convection stops. When circulation stops, the impurity ion concentration in the cooling liquid 12 increases again, and as it does, the electric current begins to flow again in the cooling liquid 12 between the electrodes 71 and 72. Impurity ions are thus removed by the cooling liquid 12 being circulated through the ion filter 17, which is achieved by heating the cooling liquid 12.

Accordingly, it is possible for the removal of impurity ions within the cooling liquid to be self-regulated. This enables the structure to remove the impurity ions from the cooling liquid 12 to be simpler than a control mechanism that is based on, for example, the detection of the impurity ion concentration (conductivity) and the period of time that has passed after the fuel cell has stopped as in the foregoing exemplary embodiments.

Figure 16:
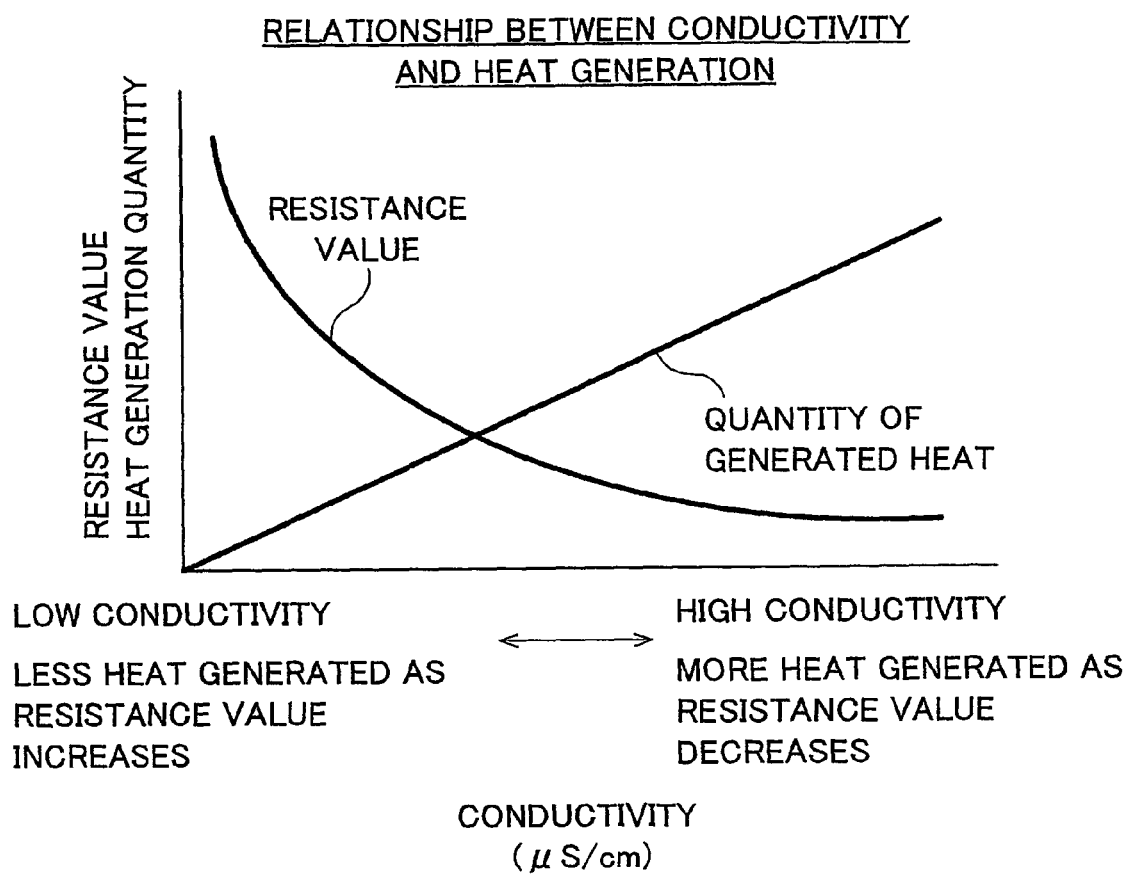
FIG. 16 is a graph illustrating the relationship between the specific resistance (1/conductivity) of the cooling liquid between electrodes and the amount of heat generated by the cooling liquid according to the ninth exemplary embodiment of the invention.

FIG. 16 is a graph showing the relationship between the specific resistance (i.e., the reciprocal of the conductivity) of the cooling liquid 12 and the amount of heat generated. When the conductivity of the cooling liquid 12 is high, the electric current flowing in the cooling liquid 12 increases such that the cooling liquid 12 generates heat. When the conductivity of the cooling liquid 12 is low, the electric current flowing in the cooling liquid 12 decreases such that the cooling liquid 12 generates either no heat or only a small amount of heat. The electric current flowing between the electrodes and the resistance between the electrodes is determined by the distance between the electrodes, the opposing surface area of the electrodes, the voltage applied, and the conductivity of the cooling liquid. The electrodes 71 and 72 may alternatively be provided at the outlet of the fuel cell 13 or near the radiator 11.

As described above, convection is created in the cooling liquid passage 14 when the cooling liquid 12 between the electrodes 71 and 72 generates heat. When the amount of the cooling liquid 12 that passes through the ion filter 17 increases, the conductivity between the electrodes 71 and 72 drops. As a result, less heat is generated in the cooling liquid 12 which causes the convection to stop. When the convection stops, the impurities (e.g., ions) leached into the cooling liquid 12 increase so the cooling liquid 12 between the electrodes is heated again. Repeating this process removes the impurities in the cooling liquid 12, thereby suppressing a decrease in insulation performance of the fuel cell 13.

Figure 17:
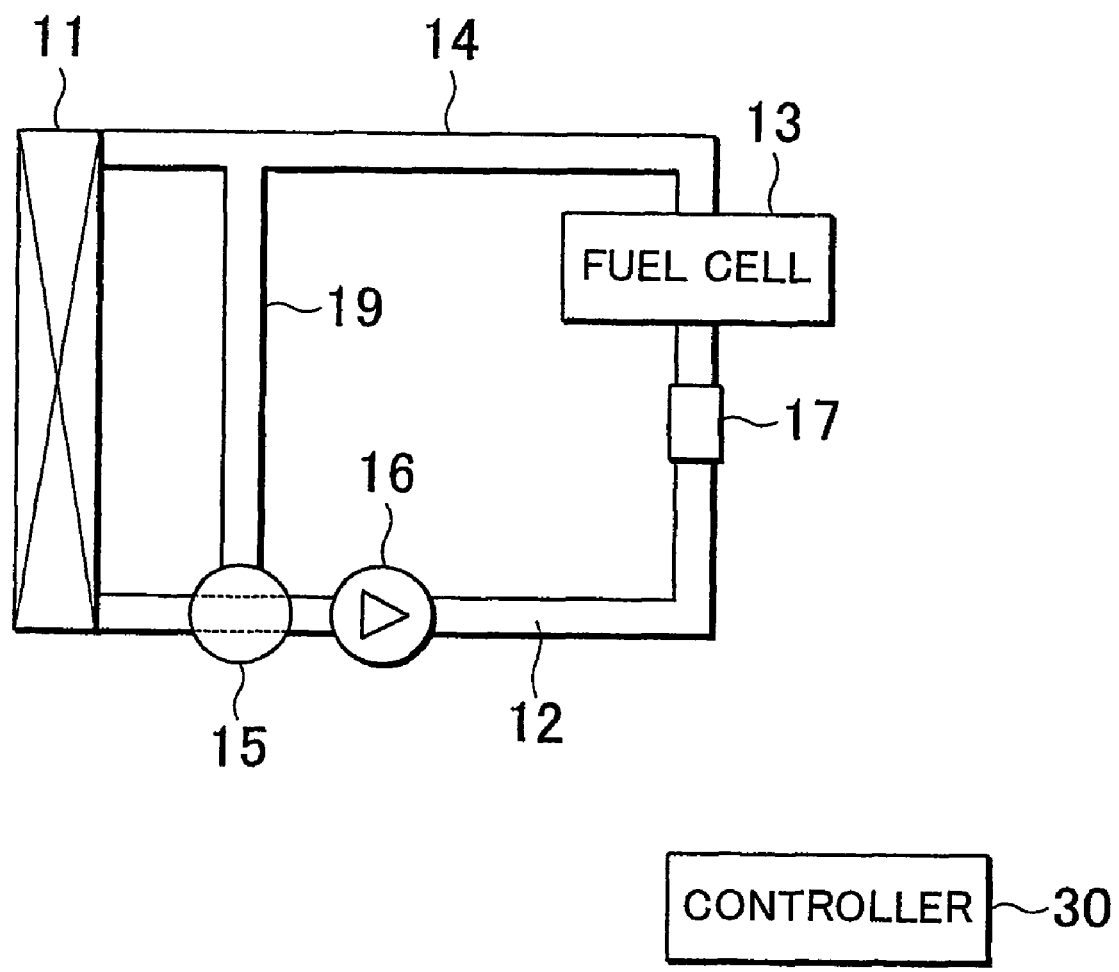
FIG. 17 is a view showing a tenth exemplary embodiment of the invention.

A tenth exemplary embodiment of the invention will be described with reference to FIG. 17. Portions in FIG. 17 corresponding to portions in FIG. 1 will be referred to by the same reference numerals, and descriptions of those portions will be omitted. This exemplary embodiment uses the radiator 11, which is a heat exchanger, as the heat source to create a convection current in the cooling liquid 12. The structure, such as the radiator 11, the fuel cell 13, the cooling liquid passage 14, the rotary valve 15, and the water pump 16, is the same as the example shown in FIG. 1.

The controller 30 in this exemplary embodiment sets rotary valve 15 so that the flow path leads to the radiator 11 when operation of the fuel cell 13 is stopped or a vehicle equipped with the fuel cell is turned off. As a result, a temperature difference is created between the cooling liquid 12 that is in the radiator 11 and cooled (or heated) by outside air and the cooling liquid 12 elsewhere. This temperature difference generates convection in the cooling liquid passage 14, which causes the cooling liquid 12 to flow into the ion filter 17 so that ions in the cooling liquid 12 are removed.

This structure obviates the need to add a heat exchanger (such as the fins 18). In an ordinary vehicle, a thermostat valve is used instead of the rotary valve 15. In this case, when the temperature of the cooling liquid falls after the system is stopped, the valve closes so that the cooling liquid flows through the bypass passage 19 instead of through the radiator 11. This exemplary embodiment solves this problem by employing the rotary valve 15 and using the controller 30 to switch the rotary valve 15 when the fuel cell 13 is stopped. The rotary valve 15 may also be provided in parallel with a thermostat valve.

An eleventh exemplary embodiment of the invention will be described with reference to FIG. 18. Portions in FIG. 18 corresponding to portions in FIG. 11 will be referred to by the same reference numerals, and descriptions of those portions will be omitted.

This exemplary embodiment creates a convection current in the cooling liquid while the fuel cell 13 is not operating or when a system of a vehicle equipped with the fuel cell is turned off by providing a heat source in the cooling liquid sub-passage 22. As a result, the cooling liquid in the main tank is circulated through the ion filter provided in the cooling liquid sub-passage 22 such that impurity ions, in the cooling liquid are removed.

Figure 18:
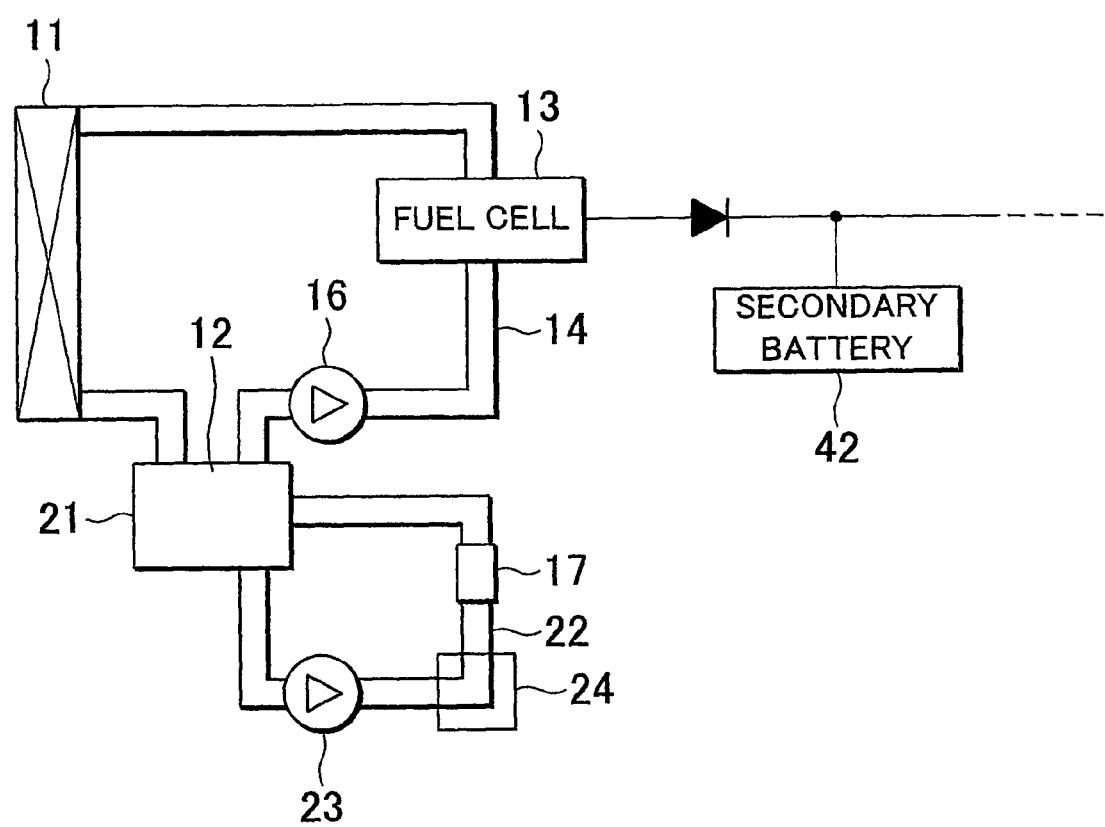
FIG. 18 is a view showing an eleventh exemplary embodiment of the invention.

Referring to FIG. 18, a heat source 24 is disposed in the cooling liquid sub-passage 22, through which the cooling liquid 12 circulates, that connects the main tank 21 with the ion filter 17. The heat source 24 may be any one of various structures such as the hydrogen-absorbing alloy tank 51 (shown in FIG. 12), the thermoelectric element 45 (shown in FIG. 13), the heat retaining pot 62 (shown in FIG. 14), or the cooling liquid itself (shown in FIG. 15).

By providing a structure that includes this type of cooling liquid sub-passage, even when operation of the fuel cell 13 is stopped or a system of a vehicle equipped with the fuel cell is turned off, convection can be generated in the cooling liquid sub-passage 22 either constantly or at times such as when the impurity ion concentration (conductivity) in the cooling liquid 12 exceeds a reference value or when a predetermined period of time has passed after the fuel cell 13 has stopped. As a result, the cooling liquid 12 is passed through the ion filter 17, thereby suppressing an increase in the impurity ion concentration.

A twelfth exemplary embodiment of the invention will be described with reference to FIG. 19. Portions in FIG. 19 corresponding to portions in FIG. 1 will be referred to by the same reference numerals, and descriptions of those portions will be omitted.

Figure 19:
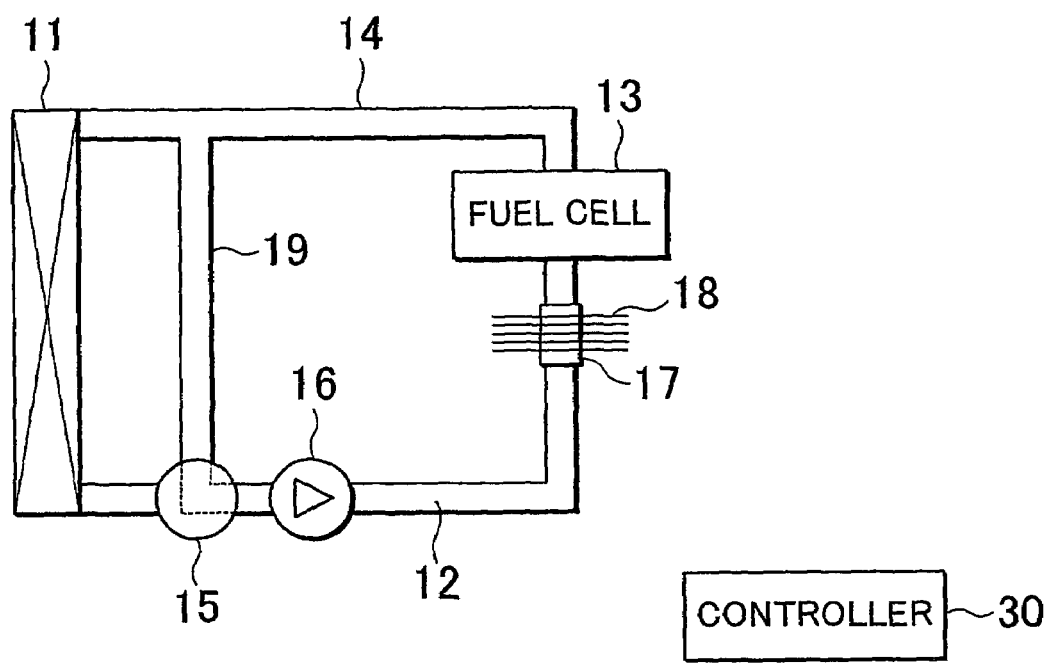
FIG. 19 is a view showing a twelfth exemplary embodiment of the invention.

The cooling system for the fuel cell 13 as shown in FIG. 19 includes a radiator 11, which serves as a heat exchanger that cools the cooling liquid 12 using outside air, the cooling liquid 12, the fuel cell 13, the cooling liquid passage 14, the rotary valve 15, the water pump 16, the ion filter 17, the heat exchange fins or heat pipe 18, the bypass passage 19, and the controller 30. More specifically, the ion filter 17 is provided near the cooling liquid inlet of the fuel cell 13. As a result, the cooling liquid 12 from which impurity ions have been removed is supplied to the fuel cell 13.

The controller 30 controls the rotary valve 15 and the water pump 16. The controller 30 may be, for example, a computer system that is provided separately as a cooling control system of the fuel cell 13, or the functions of the controller 30 may simply be realized by functions of a control computer of the fuel cell system.

Figure 20:
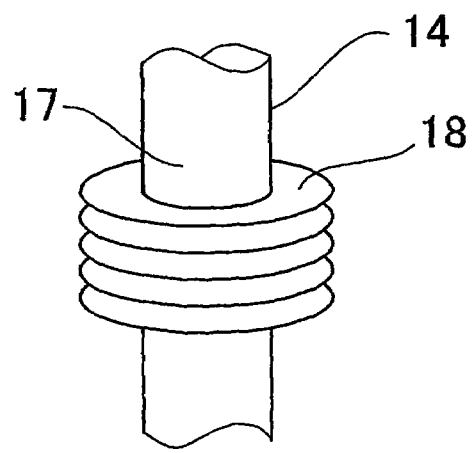
FIG. 20 is a view illustrating one example of fins provided on an ion filter.
Figure 21:
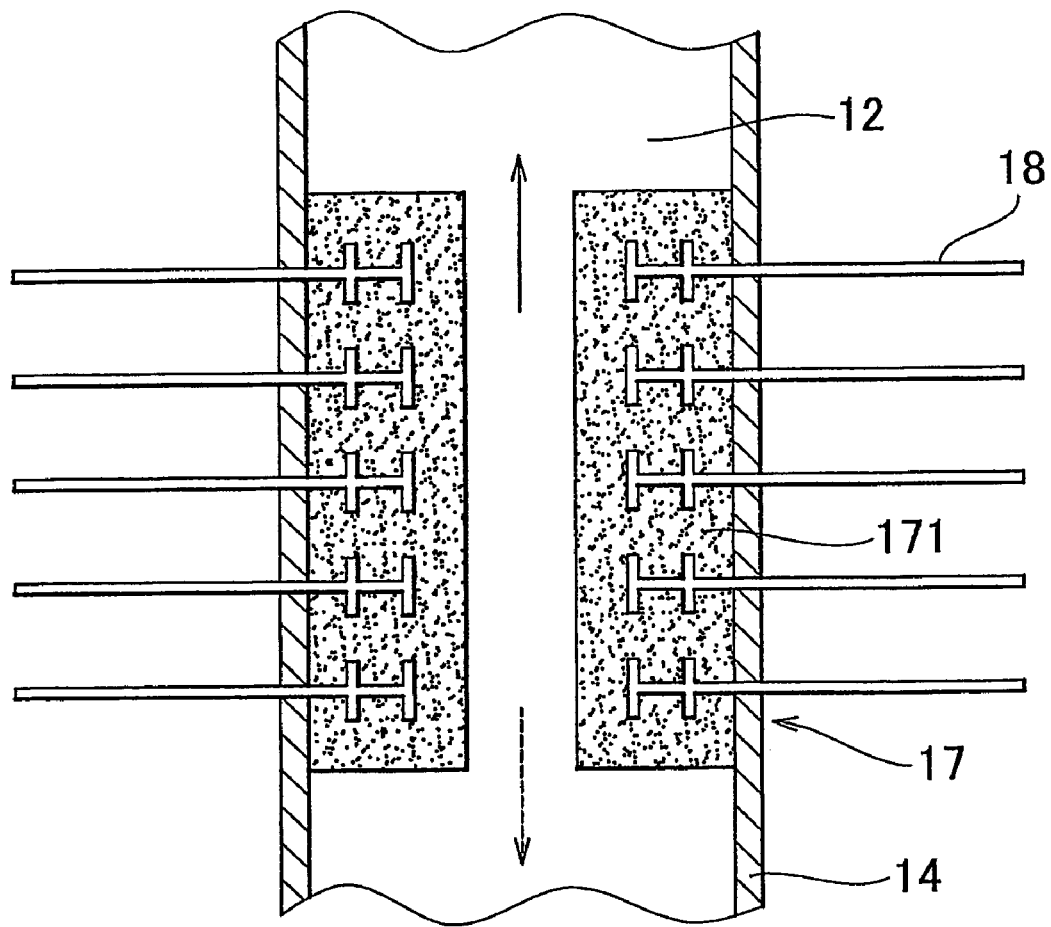
FIG. 21 is a sectional view showing a characteristic of the finned ion filter.

FIG. 20 is a perspective view of the ion filter 17 and heat releasing fins 18 provided on a portion of the cooling liquid passage 14. FIG. 21 is a perspective view of the ion filter 17 provided with the heat releasing fins 18 shown in FIG. 20 cut in the axial direction of the cooling liquid passage 14.

As shown in the drawing, the ion filter 17, which includes an ion exchange resin 171 and a filter that remove fine particles, is provided in one portion (in the pipe, in the example shown in the drawing) of the cooling liquid passage 14. This ion exchange resin 171 absorbs ions that have leached into the cooling liquid 12 from the fuel cell stack and the like. The ion exchange resin 171 is in contact with a plurality of the heat exchange fins 18. The radially outer portions of these heat exchange fins 18 are in contact with a heat source (such as outside air) outside of the cooling liquid passage 14, while the radially inner portions of these fins 18 are in contact with the ion exchange resin 171.

The heat exchange fins 18 cool or heat the ion exchange resin 171 and the cooling liquid 12 through thermal conduction according to the temperature difference between the heat source outside and the cooling liquid 12 inside. When the temperature of the outside air is greater than the temperature of the cooling liquid 12, the cooling liquid 12 flows in the direction indicated by the arrow shown by the solid line in FIG. 21. When the temperature of the outside air is less than the temperature of the cooling liquid 12, the cooling liquid 12 flows in the direction indicated by the arrow shown by the broken line in FIG. 21. Because the cooling liquid 12 has a large heating capacity, there is a delay in the change in the temperature of the cooling liquid 12 following a change in the temperature of the outside air. This delay results in a temperature gradient between the outside air and the cooling liquid 12, making heat exchange using the heat exchange fins 18 possible.

Another method for heat exchange through thermal conduction employs the use of a heat pipe which houses a fluid body heat carrier for the portion of the cooling liquid passage 14 with the heat exchange fins 18.

According to this structure, when the fuel cell 13 is not operating or when a system of a vehicle equipped with the fuel cell is turned off, the controller 30 switches the rotary valve so that the flow path is via the bypass passage 19 to facilitate circulation of the cooling liquid 12 through the ion filter 17. A heat source such as outside air around the heat exchange fins 18 is used to generate, at the ion filter 17 portion, a temperature difference between the cooling liquid 12 at the ion filter 17 portion and the cooling liquid 12 elsewhere. This temperature difference thus creates convection in the cooling liquid passage 14.

This convection causes the cooling liquid 12 to circulate through the ion filter 17 even when the fuel cell 13 is not operating or when a system of a vehicle equipped with the fuel cell is turned off, thereby suppressing to the greatest extent possible an increase in the impurity ion concentration (conductivity). As a result, it is possible to avoid a reduction in insulating resistance of the cooling liquid 12, and therefore shorten the startup time of the fuel cell 13.

The twelfth exemplary embodiment enables an increase in the ion concentration in the cooling liquid 12 to be suppressed without using power (e.g., without using a water pump or a heater) when the fuel cell 13 is not operating or when a system of a vehicle equipped with the fuel cell is turned off. Further, in the case of a vehicle, it is possible to prevent battery drain and a decrease in fuel efficiency. This exemplary embodiment is preferable particularly when operation of the fuel cell 13 or the system of a vehicle equipped with the fuel cell is to be stopped for an extended period of time.

Moreover, this exemplary embodiment makes it possible to increase the amount of heat released by the heat exchange fins 18 to the outside when the temperature of the fuel cell 13 is high while the fuel cell 13 is being operated. As a result, the radiator 11 can be made that much smaller, which is an advantage.

A thirteenth exemplary embodiment of the invention will be described with reference to FIG. 22. Portions in FIG. 22 corresponding to portions in FIG. 11 will be referred to by the same reference numerals, and descriptions of those portions will be omitted. According to this exemplary embodiment, the finned ion filter 17 used in the exemplary embodiment illustrated in FIG. 19 is provided in the cooling liquid sub-passage 22. A heat source such as outside air around the fins is used to create a temperature difference in the cooling liquid, which in turn generates convection within the cooling liquid sub-passage 22. This convection circulates the cooling liquid 12 through the ion filter 17 even when the fuel cell 13 is not operating or when a system of a vehicle equipped with the fuel cell is turned off.

Figure 22:
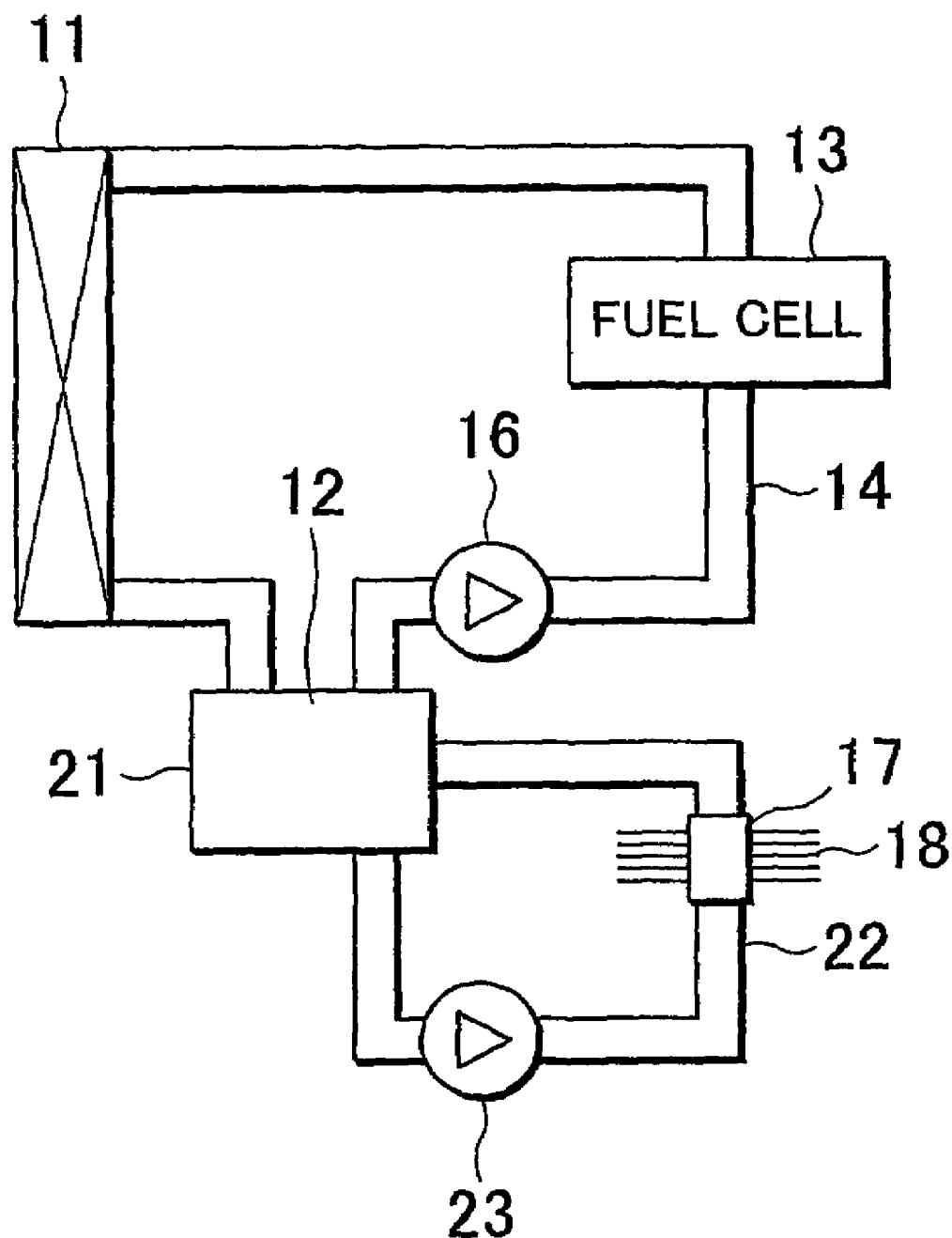
FIG. 22 is a view showing a thirteenth exemplary embodiment of the invention.

In FIG. 22, the heat exchange fins 18 are shown provided on the ion filter 17 disposed in the cooling liquid sub-passage 22, just as they are in FIG. 21. These fins 18 transfer heat between the atmosphere around them and the cooling liquid 12. Thus, even when the water pump 23 is no longer operating due to the fact that operation of the fuel cell 13 has been stopped or that the system of the vehicle equipped with the fuel cell has been turned off, a temperature difference is created between the cooling liquid 12 near the fins 18 and the cooling liquid 12 elsewhere, which generates convection in the cooling liquid sub-passage 22 that moves the cooling liquid 12 through the ion filter 17.

As a result, impurity ions within the cooling liquid 12 are removed, thereby suppressing an increase in the concentration of impurities in the cooling liquid 12 within the main tank 21. It is therefore possible to prevent a reduction in the insulating resistance of the cooling liquid 12 and thereby reduce the startup time of the fuel cell 13.

A fourteenth exemplary embodiment will now be described with reference to FIGS. 23 and 24. The radiator 11 is used in each of the foregoing exemplary embodiments. Providing the ion filter 17 inside the radiator 11 enables the impurity ions in the cooling liquid 12 to be removes without greatly changing the structure of the cooling liquid for the fuel cell. The radiator 11 is arranged in a location where it is well ventilated, such as at the front of the vehicle, so that it is more directly subjected to changes in the outside air temperature.

Figure 23:
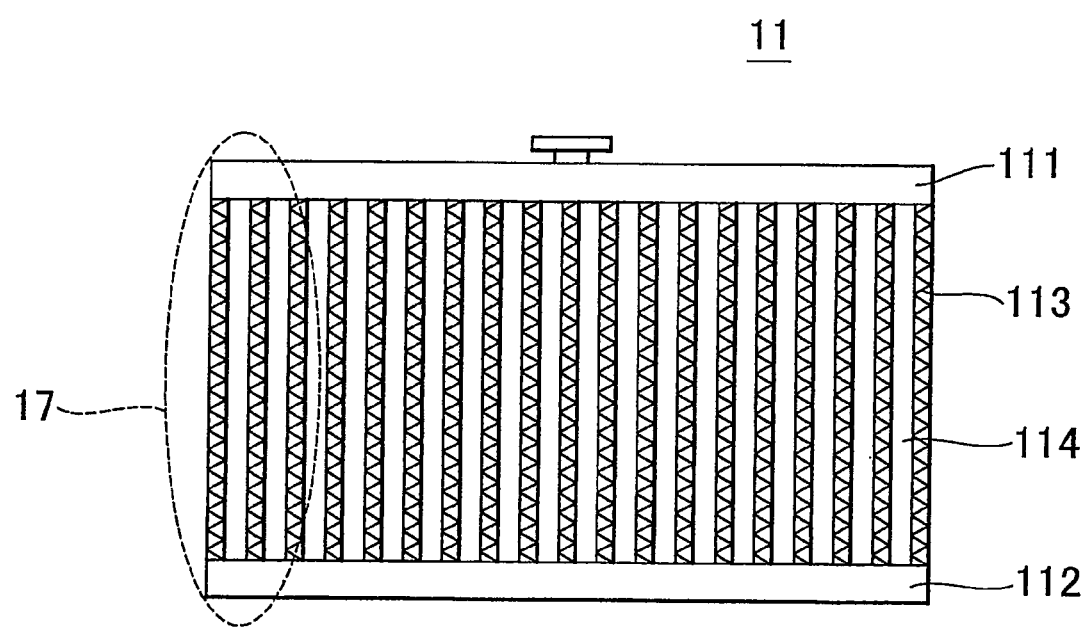
FIG. 23 is a view showing a fourteenth exemplary embodiment of the invention.

As shown in FIG. 23, in the radiator 11 a plurality of thin pipes 114 connect an upper tank 111 located at the upper portion of the radiator 11 and a lower tank 112 located at the lower portion of the radiator 11. Heat release fins 113 are formed on each of these thin pipes 114. Although not shown in the drawing, the cooling liquid passage 14 is connected to both the upper tank 111 and the lower tank 112.

Figure 24:
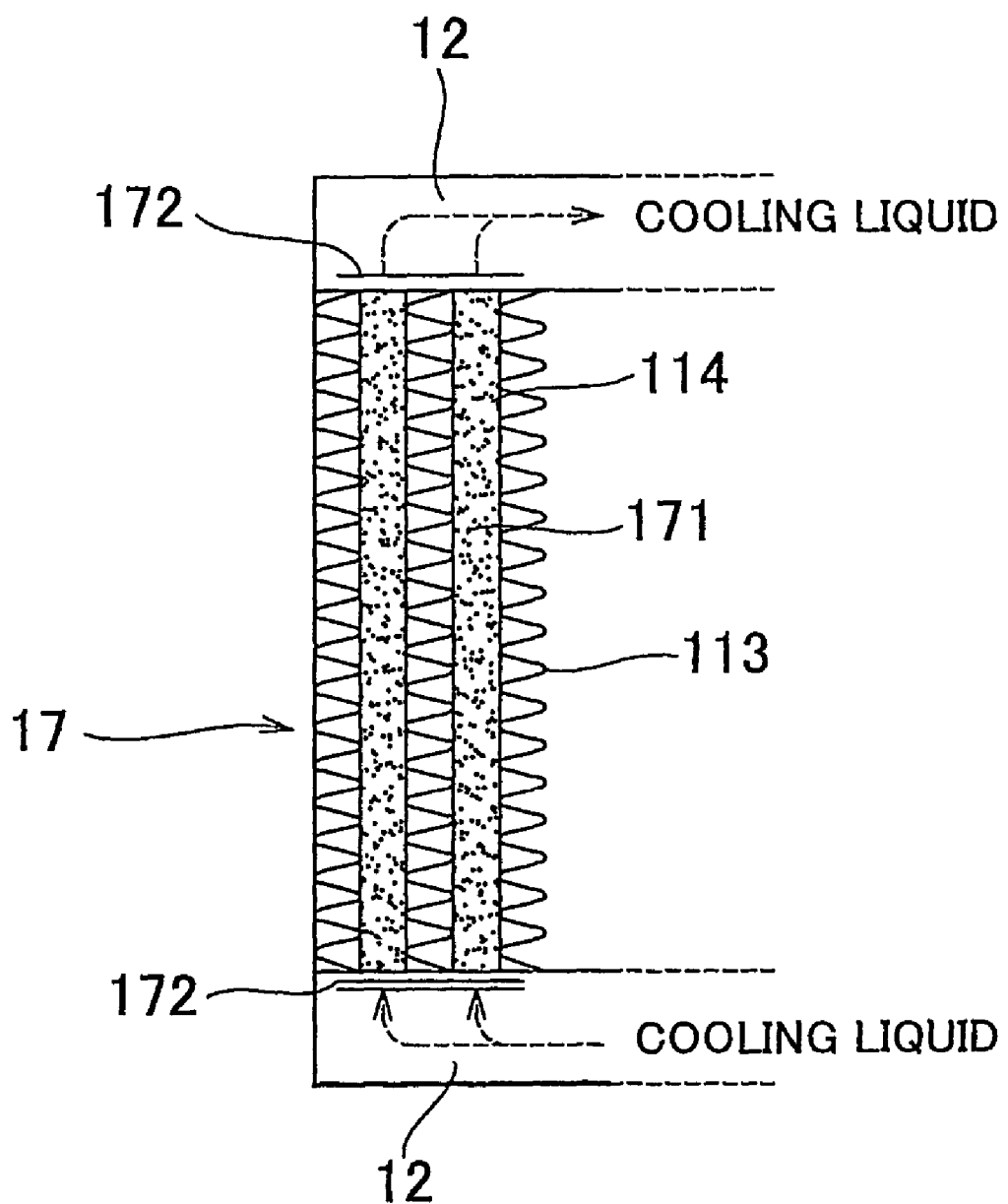
FIG. 24 is an enlarged sectional view of a portion of a radiator.

FIG. 24 is an enlarged sectional view of a portion of the ion filter 17 in the radiator 11 shown in FIG. 23. As shown in FIG. 24, a portion of the plurality of thin pipes 114 serves as the ion filter 17 charged with the ion exchange resin 171. The amount of ion exchange resin 117 used and the internal diameter and number of the thin pipes 114 can be set as appropriate. Filters 172 for removing foreign matter such as fine particles are provided on both end sides of the thin pipes 114. Alternatively, these filters 172 may be provided inside the thin pipes 114.

With the related art, as described above, when the water pump 16 stops due to, for example, operation of the fuel cell being stopped or the system of a vehicle equipped with the fuel cell being turned off, the cooling liquid 12 stops flowing. As a result, ions leach into the cooling liquid 12, increasing the concentration of impurities in it. According to this exemplary embodiment, when operation of the fuel cell 13 stops, the radiator 11 creates a temperature difference within the cooling liquid passage 14 which creates convection. In the case of a vehicle, this temperature difference can be set appropriately by changing the arrangement of the radiator 11 or the airflow design to the radiator 11. When the temperature difference is created between the thin pipes 114 charged with the ion exchange resin 117 and the cooling liquid passage, a convection current is generated in the cooling liquid 12 inside the radiator 11. This convection current causes the cooling liquid 12 to circulate through the ion exchange resin 171, thereby making it possible to reduce the concentration of ions (i.e., conductivity) in the cooling liquid 12.

With this exemplary embodiment, ions are removed in the radiator (which is an ion producing source) where they easily leach into the cooling liquid 12, so good ion removal efficiency is able to be achieved. Furthermore, this exemplary embodiment can easily be applied without changing the structure of the conventional cooling system.

According to the above-described exemplary embodiments of the invention, the water pump is intermittently operated when the impurity ion concentration (conductivity) in the cooling liquid exceeds a reference value while the fuel cell is not operating or when a system of a vehicle equipped with the fuel cell is turned off. Circulating the cooling liquid through the ion filter removes the impurity ions from within the cooling liquid, thereby enabling the required insulating resistance of the cooling liquid to be achieved. This obviates the need to process the cooling liquid upon startup of the fuel cell, which makes it possible to reduce the startup time of the fuel cell. Furthermore, electric energy is able to be conserved because the water pump is operated intermittently, that is, only when necessary.

Also according to one of the exemplary embodiments, the water pump is intermittently operated when a predetermined period of time has passed when the fuel cell is not operating or when a system of a vehicle equipped with the fuel cell is turned off. As mentioned above, circulating the cooling liquid through the ion filter removes the impurity ions from within the cooling liquid, thereby enabling the required insulating resistance of the cooling liquid to be achieved. This obviates the need to process the cooling liquid upon startup of the fuel cell, which makes it possible to reduce the startup time of the fuel cell. Furthermore, electric energy is able to be conserved because the water pump is operated intermittently, that is, only when necessary.

According to another of the exemplary embodiments, a heat source is used to create a convection current in the cooling liquid, which circulates the cooling liquid through the ion filter to remove impurity ions from within the cooling liquid, thereby enabling the required insulating resistance of the cooling liquid to be achieved. This obviates the need to process the cooling liquid upon startup of the fuel cell, which makes it possible to reduce the startup time of the fuel cell. Furthermore, electric energy is able to be conserved because the water pump is operated intermittently, that is, only when necessary.

Examples of the heat source given in the above-described exemplary embodiments include a hydrogen-absorbing alloy tank, a cooling liquid, a thermoelectric element, a conductive heating, the outside air temperature and the like. A heat source other than one of the examples mentioned, such as direct sunlight, for example, may also be used. The heat from the direct sunlight may be used to directly heat some of the cooling liquid to generate convection, or it may be transferred by means of a heat pipe or the like to generate convection.

Further, characteristics or characteristic structure in the foregoing exemplary embodiments can be used in combination as appropriate. For example, the finned ion filter shown in FIG. 20 can also be used in the exemplary embodiment in which the water pump is intermittently operated (see FIGS. 1, 4, and 9, for example). The finned ion filter can also be used in the exemplary embodiment in which a separate heat source is used to create convection (see FIGS. 12, 13, 14, and 15, for example). Combinations such as these promote convection in the cooling liquid.

Further, a radiator with an ion filter, as shown in FIGS. 23 and 24, can be used for the radiator in the exemplary embodiments. Also, the water pump may be designed to have a plurality of control modes, and it may be used switching between these modes. For example, the power source for the water pump may be switched from the secondary battery to the fuel cell depending on the state-of-charge or state of the secondary battery (see FIGS. 2 and 5, for example). For example, the fuel cell may be started up when there is a problem with the secondary battery, such as a failure or over-discharge.

Thus, the cooling system for a fuel cell according to the invention is advantageous in that it enables quick startup even after operation of the fuel cell has been stopped for an extended period of time. This quick startup is achieved by the cooling system suppressing an increase in the conductivity of the cooling liquid even when the fuel cell is not operating or when a system of a vehicle equipped with the fuel cell is turned off.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A cooling system for a fuel cell of a fuel cell system located in a vehicle, comprising:
   a cooling apparatus that regulates the temperature of the fuel cell by supplying a cooling liquid to the fuel cell using a pump,
   an impurity-removing device provided in a cooling liquid passage for the cooling liquid, which removes impurities within the cooling liquid,
   an impurity detector configured to detect the state of impurities in the cooling liquid, and
   a flow generator that determines whether impurities exceed a predetermined value, after confirming that the fuel cell is stopped, and that causes the cooling liquid inside the cooling liquid passage to flow through the impurity removing device by activating the fuel cell in a case that the flow generator determines that impurities exceed the predetermined value, or
   determines whether impurities exceed a predetermined value, after confirming that the pump is stopped, and that causes the cooling liquid inside the cooling liquid passage to flow through the impurity removing device by activating the pump in a case that the flow generator determines that impurities exceed the predetermined value.

2. The cooling system according to claim 1, further comprising:
   a startup controller for staffing the fuel cell when a predetermined quantity or greater of the impurities is detected.

3. The cooling system according to claim 1, further comprising:
   a pump controller for starting the pump when a predetermined quantity or greater of the impurities is detected.

4. The cooling system according to claim 2, wherein:
   the flow generator further includes a pump controller for staffing the pump when a predetermined quantity or greater of the impurities is detected.

5. The cooling system according to claim 3, further comprising a secondary battery which supplies power to the pump, wherein the pump controller is adapted to control an operating quantity of the pump based on a state of the secondary battery.

6. The cooling system according to claim 2, wherein:
   the impurity detector is adapted to determine a change in the state of the impurities in the cooling liquid based on the amount of time that elapses after the pump is stopped.

7. The cooling system according to claim 2, wherein:
   the impurity detector is adapted to determine a change in the state of the impurities in the cooling liquid based on the amount of time that elapses after the pump is stopped and the temperature of the cooling liquid.

8. The cooling system according to claim 2, wherein:
the flow generator includes a temperature difference generator for creating a temperature difference between a portion of the cooling liquid within the cooling liquid passage and the cooling liquid elsewhere.

9. The cooling system according to claim 8, wherein:
the temperature difference generator is a heat transfer element for transferring heat energy that is outside of the cooling liquid passage to inside the cooling liquid passage.

10. The cooling system according to claim 9, wherein:
the heat transfer element includes a heat exchanger that transfers the heat energy that is outside of the cooling liquid passage to inside the cooling liquid passage.

11. The cooling system according to claim 8, wherein:
the temperature difference generator is either a heat generating body or a heat absorbing body.

12. The cooling system according to claim 8, wherein:
the temperature difference generator is an accumulator which is provided in the cooling liquid passage and which stores heat while the fuel cell is operating.

13. The cooling system according to claim 12, wherein:
the accumulator is a cooling liquid storage device that stores the cooling liquid, and the accumulator is provided with a supply apparatus that supplies, in response to a temperature difference, the cooling liquid stored while the fuel cell was operating to the cooling liquid passage.

14. The cooling system according to claim 8, wherein:
the cooling apparatus is a heat exchanger; and
the impurity-removing device is provided in the heat exchanger.

15. A method for controlling circulation of a cooling liquid in a cooling system for a fuel cell of a fuel cell system including a cooling apparatus that regulates the temperature of the fuel cell by supplying the cooling liquid to the fuel cell using a pump, and an impurity-removing device provided in a cooling liquid passage for the cooling liquid, which removes impurities within the cooling liquid, the method comprising
providing a flow generator that includes an impurity detector;
detecting impurities in the cooling liquid with the impurity detector; and
determining whether impurities exceed a predetermined value, after confirming that the fuel cell is stopped, and causing the cooling liquid inside the cooling liquid passage to flow through the impurity removing device by activating the fuel cell in a case that the flow generator determines that impurities exceed the predetermined value, or
determining whether impurities exceed a predetermined value, after confirming that the pump is stopped, and causing the cooling liquid inside the cooling liquid passage to flow through the impurity removing device by activating the pump in a case that the flow generator determines that impurities exceed the predetermined value.

* * * * *

UNITED STATES PATENT AND TRADEMARK OFFICE
CERTIFICATE OF CORRECTION

| | |
|---|---|
| PATENT NO. | : 7,662,496 B2 |
| APPLICATION NO. | : 10/557699 |
| DATED | : February 16, 2010 |
| INVENTOR(S) | : Nobuo Fujita et al. |

Page 1 of 1

It is certified that error appears in the above-identified patent and that said Letters Patent is hereby corrected as shown below:

| Column | Line | |
|---|---|---|
| 26 | 44 | Change "staffing" to --starting--. |
| 26 | 52 | Change "staffing" to --starting--. |

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,662,496 B2 Page 1 of 1
APPLICATION NO. : 10/557699
DATED : February 16, 2010
INVENTOR(S) : Fujita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this

Thirtieth Day of November, 2010

David J. Kappos
*Director of the United States Patent and Trademark Office*